US012577176B2

(12) United States Patent
Kohlhauser et al.

(10) Patent No.: US 12,577,176 B2
(45) Date of Patent: Mar. 17, 2026

(54) OVERLAY COATING RESISTANT TO MOLTEN CALCIUM-MAGNESIUM-ALUMINO-SILICATE

(71) Applicant: Oerlikon Surface Solutions AG, Pfäffikon, Pfäffikon (CH)

(72) Inventors: Bernhard Kohlhauser, Vienna (AT); Helmut Schoech, Feldkirch (AT); Beno Widrig, Bad Ragaz (CH); Juergen Ramm, Maienfeld (CH)

(73) Assignee: OERLIKON SURFACE SOLUTIONS AG, PFÄFFIKON, Pfäffikon (CH)

( * ) Notice: Subject to any disclaimer, the term of this patent is extended or adjusted under 35 U.S.C. 154(b) by 51 days.

(21) Appl. No.: 18/579,024

(22) PCT Filed: Jul. 12, 2022

(86) PCT No.: PCT/EP2022/000062
§ 371 (c)(1),
(2) Date: Jan. 12, 2024

(87) PCT Pub. No.: WO2023/284994
PCT Pub. Date: Jan. 19, 2023

(65) Prior Publication Data
US 2024/0327308 A1      Oct. 3, 2024

Related U.S. Application Data

(60) Provisional application No. 63/221,069, filed on Jul. 13, 2021.

(51) Int. Cl.
C04B 41/45      (2006.01)
C04B 41/52      (2006.01)
C04B 41/90      (2006.01)

(52) U.S. Cl.
CPC ........ C04B 41/4515 (2013.01); C04B 41/526 (2013.01); C04B 41/90 (2013.01)

(58) Field of Classification Search
None
See application file for complete search history.

(56) References Cited

U.S. PATENT DOCUMENTS 6,620,525 B1 * 9/2003 Rigney ................... C23C 28/42
428/323
11,584,984 B2      2/2023 Ramm et al.
(Continued)

FOREIGN PATENT DOCUMENTS

EP            2363509 A1      9/2011
WO      2018/010936 A1      1/2018

OTHER PUBLICATIONS

Levi et al., "Environmental Degradation of Thermal-Barrier Coatings by Molten Deposits", MRS Bulletin, vol. 37, Oct. 2012, pp. 932-941.
(Continued)

*Primary Examiner* — David Sample
(74) *Attorney, Agent, or Firm* — Chrisman Gallo Tochtrop LLC

(57)                ABSTRACT

A CMAS resistant overlay coating including at least one CMAS resistant layer, wherein the overlay coating is i. disposed over a surface of a substrate including a material susceptible to CMAS corrosion, ii. includes a metal oxide matrix and iii. has at least partially a vertical columnar structure. Moreover, at least one non-oxidized metallic constituent selected from the group of aluminum, chromium and metallic constituents including aluminum and chromium is embedded in the metal oxide matrix. Furthermore, a substrate has a CMAS resistant overlay coating at issue on a surface of a material susceptible to CMAS corrosion. A CAE
(Continued)

process is provided for forming such a CMAS resistant overlay coating on a surface of a material susceptible to CMAS corrosion.

23 Claims, 8 Drawing Sheets

(56)                          References Cited

U.S. PATENT DOCUMENTS

2008/0113095 A1     5/2008  Gorman et al.
2014/0255680 A1*    9/2014  Lee ...................... C04B 41/009
                                                 428/312.6

OTHER PUBLICATIONS

International Search Report and Written Opinion of International Application No. PCT/EP2022/000062 dated Oct. 18, 2022, 11 pages.

\* cited by examiner

240 → tilt    HFW    WD    mag 🔲 spot  det  HV
0.0 °  41.4 μm  5.8 mm  5 000 x  11.0  Mix  5.00 kV
⌐————10 μm————⌐
2861-M1 auf DLR Eb-PVD TBC

Fig. 5

OVERLAY COATING RESISTANT TO MOLTEN CALCIUM-MAGNESIUM-ALUMINO-SILICATE

The present invention concerns a calcium-magnesium-alumino-silicate (CMAS) resistant overlay coating and a cathodic arc evaporation (CAE) process for forming such a CMAS resistant overlay coating on a surface of a substrate comprising or consisting of a material susceptible to CMAS corrosion. Furthermore, the invention relates to a substrate comprising or consisting of a material susceptible to CMAS corrosion and having a CMAS resistant overlay coating at issue on a surface of at least one substrate layer, wherein the substrate is particularly obtained or obtainable by the aforementioned process.

To increase the operation temperature of stationary and aviation gas turbines and thereby enhance turbine efficiency an intricate cooling system for turbine blades is required. Such a system is usually realized by internal cooling channels, cooling holes to generate a film of cool gas at the blade surface and a thermal barrier coating (TBC) system comprising a ceramic top coating exhibiting low thermal conductivity to maximize the temperature gradient from the coating surface to the coating-to-blade interface.

For thermal insulation a conventional TBC system comprises a porous or strain-tolerant ceramic top coating, commonly also referred to as thermal barrier coating. Typically, a thermal barrier coating based on yttria-stabilized zirconia (YSZ) is disposed on a thermally grown oxide (TGO) layer. The latter, in turn, is arranged on a bond coat (BC) layer. Two non-limiting examples of conventional thermal barrier coating compositions are 7 wt. % yttria-stabilized zirconia (7YSZ) and 8 wt. % yttria-stabilized zirconia (8YSZ). YSZ-based thermal barrier coatings are characterized by their high toughness and low thermal conductivity up to high temperatures. They are usually deposited by atmospheric plasma spraying (APS) or electron beam physical vapor deposition (EB-PVD). APS leads to a dense vertically or horizontally cracked structure, while EB-PVD delivers a columnar structure that can sustain the significant mismatch of thermal expansion between the metallic blade and the ceramic coating. For this reason, the columnar structure is favored for aero engine applications, even though production costs are comparatively high.

Molten deposits based on calcium-magnesium-alumino-silicate (CMAS), originating from atmospheric dust ingested with the intake air and adhered to the surfaces in the hot gas path of a gas turbine, have been recognized as a critical factor affecting the durability of conventional thermal barrier coatings. Moreover, they are a fundamental barrier to progress in the field of gas turbine technology. The reason is as follows: Most CMAS deposits melt around or above 1.200° C. As a consequence, with increasing engine operating temperatures, e.g. take-off or landing of an aircraft, a glassy melt based on CMAS is formed which attacks the thermal barrier coating being typically a YSZ layer. The melt can chemically dissolve the thermal barrier coating, usually followed by precipitation of new phases effectively destroying the columnar or feather-like structure of the thermal barrier coating. As an alternative or in addition, CMAS melts can infiltrate the porous or columnar structure of the thermal barrier coating, i.e. the void spaces accommodating the strain incompatibility with the metallic substrate, and solidify upon shut-down of the engine. As a consequence, the tolerance of the thermal barrier coating against thermal expansion of the turbine blade is significantly reduced, leading to cracking and delamination of the thermal barrier coating. The penetration of CMAS melts can also go as far as to the BC layer, whereby the melt chemically interacts with the TGO layer. The result is delamination along the TGO layer and potentially promotion of creep cavitation in the BC layer, wherein the delamination crack path would propagate within the metal, rather than the ceramic layers. (see, for example, C. G. Levi, J. W. Hutchinson, M.-H. Vidal-Sétif, C. A. Johnson, *MRS Bulletin* 2012, 37, 932-941)

Various strategies for the mitigation of CMAS induced degradation and corrosion, respectively, have been developed. The up to now most promising strategy seeks to increase the reactivity between the thermal barrier coating and the CMAS melt by applying a CMAS reactive thermal barrier coating. Thereby the melt is consumed, while the crystalline reaction products form a dense layer and block the paths for further melt infiltration. In other words, the crystalline reaction products form a CMAS resistant layer.

Most of the CMAS reactive thermal barrier coatings known from prior art are based on rare earth zirconates predominantly comprising the rare earth elements gadolinium (Gd), ytterbium (Yb) or samarium (Sm). Disadvantageously, these CMAS reactive thermal barrier coatings typically have a lower toughness than conventional thermal barrier coatings based on YSZ compositions. Therefore, CMAS reactive thermal barrier coatings are only provided in addition to a conventional thermal barrier coating, i.e. as a top layer over a YSZ-based or a low k thermal barrier coating. For forming such a CMAS reactive thermal barrier coating the same techniques are applied as for deposition of the underlying thermal barrier coating in each case: APS or EB-PVD.

However, this approach has the disadvantage that the material expenses are rather high. The main reason for this is that two rare earth metal containing layers are required, whereby separation and isolation of rare earth metals is complicated and time-consuming. In addition, the processes of forming such CMAS reactive top layers are also comparatively cost-intensive.

In summary, from an economic and ecologic point of view the pre-known CMAS reactive thermal barrier coating compositions, the CMAS resistant top layers based thereon as well as the methods for forming such CMAS resistant top layers are relatively unsatisfactory.

It is an objective of the present invention to overcome the above-mentioned and other disadvantages of the state of the art and to provide a CMAS resistant overlay coating which is comparatively inexpensive, versatile and durable, irrespective of surface properties, particularly the surface texture. In particular, the CMAS resistant overlay coating shall exhibit good mechanical stability and adherence to the respective underlying layer under thermal cycling, particularly up to 1.600° C. Furthermore, the invention is directed towards a substrate comprising or consisting of a material susceptible to CMAS corrosion and having a CMAS resistant overlay coating exhibiting good mechanical stability and adherence to the respective underlying layer under thermal cycling, particularly up to 1.600° C., on a surface. Another objective of the invention is a process for forming such a CMAS resistant overlay coating on a surface of a substrate comprising or consisting of a material susceptible to CMAS corrosion. The process should be comparatively versatile with respect to the surface properties, particularly the surface texture, straight-forward, relatively cost-efficient, energy-saving and easily scalable for industrial application.

The main characteristics of the invention are indicated in the claims.

According to a first aspect of the present invention the problem is solved by a calcium-magnesium-alumino-silicate (CMAS) resistant overlay coating comprising at least one CMAS resistant layer, wherein the CMAS resistant overlay coating i. is disposed on a surface of a substrate comprising or consisting of a material susceptible to CMAS corrosion, ii. comprises a metal oxide matrix, wherein at least one non-oxidized metallic constituent selected from the group consisting of aluminum, chromium and metallic constituents comprising or consisting of aluminum and chromium is embedded in the metal oxide matrix, and iii. has at least partially a vertical columnar structure.

Within the scope of the present invention the terms "CMAS resistant overlay coating" and "overlay coating" and "protective layer" are used synonymously.

The term "surface" refers to any surface area, irrespective of the surface properties, particularly irrespective of the surface texture. Moreover, the term "surface of a substrate" refers to any surface of a single-layer substrate or to any surface of a multi-layer substrate. Particularly, the term "surface of a substrate" refers to an uppermost surface of a single-layer material, to an uppermost surface of a multi-layer substrate and to an uppermost surface of any layer comprised in a multi-layer substrate. Thereby, an uppermost surface of a multi-layer substrate and an uppermost surface of an uppermost substrate layer of the multi-layer substrate are identical. A CMAS resistant overlay coating disposed on an uppermost surface of an uppermost substrate layer of a multi-layer substrate and on an uppermost surface of the multi-layer substrate, respectively, is also disposed over the underlying substrate layers.

The "substrate comprising or consisting of a material susceptible to CMAS corrosion" may be a single-layer substrate which comprises or consists of one or more materials susceptible to CMAS corrosion. The multi-layer substrate may consist of a base layer, e.g. a superalloy, and a conventional thermal barrier coating (TBC) system.

The term "thermal barrier coating system", abbreviated as TBC system, as used in the context of the invention described herein refers to a multi-layer material comprising or consisting of a porous or strain-tolerant ceramic top coating, commonly also referred to as thermal barrier coating, a thermally grown oxide (TGO) layer and a bond coat (BC) layer, wherein the ceramic top coating is disposed on the TGO layer and wherein the BC layer is disposed between a substrate, e.g. a gas turbine blade, and the TGO layer. Particularly, the BC layer is disposed between an uppermost layer of the substrate, e.g. an uppermost layer of a gas turbine blade, and the TGO layer. In the following this type of TBC system is also designated as conventional thermal barrier coating system. In addition, the ceramic top coating comprised in this type of TBC system and typically being YSZ-based is also referred to as conventional thermal barrier coating.

Within the scope of the present invention the term "layer" is synonymous with the term "film" and does not provide any information on the layer thickness or film thickness. Besides, a layer does not necessarily have a uniform thickness. However, in case a layer thickness is specified, this layer thickness shall be present at least in sections of the respective layer, namely as its maximum thickness.

According to the present invention a "material susceptible to CMAS corrosion" is, for instance, a metal, a superalloy, a ceramic material or a ceramic matrix composite (CMC), or a combination thereof. The CMC may comprise or consist of a SiC-based CMC, for instance.

The metal oxide matrix may comprise one or more stoichiometric metal oxides and/or one or more non-stoichiometric, particularly oxygen deficient, metal oxides.

Surprisingly, it was found by the inventors that, under thermal cycling, the CMAS resistant overlay coating according to the first aspect of the present invention exhibits a very good mechanical stability and excellent adherence to the immediately underlying material surface, even if temperatures of 1.500° C. or more, particularly up to 1.600° C., are applied. This particularly results from the heat-induced formation of an impermeable barrier layer with the participation of non-oxidized metallic constituents diffused from the CMAS resistant overlay coating to an interface between the overlay coating and the overlying molten CMAS material, as described in the following:

The overlay coating according to the first aspect of the present invention is capable of releasing the comprised non-oxidized metallic constituents, i.e. aluminum and/or chromium and/or one or more metallic constituents comprising or consisting of aluminum and chromium, embedded in the metal oxide matrix, at elevated temperatures, i.e. upon heating at high temperatures of about 1.000° C. or more. Then, in brief, the non-oxidized metallic constituents diffuse to an uppermost surface of the CMAS resistant overlay coating and an undermost surface of the liquid CMAS layer, respectively, and undergo a reaction with elements and/or constituents of the CMAS material, e.g. calcium, magnesium, magnesium oxide and silicon. Thereby, an impermeable barrier layer is formed which has a higher melting temperature than the CMAS materials, thus effectively inhibiting liquid CMAS materials from infiltrating the respective underlying substrate, which may comprise a TBC system, for instance, and/or from reacting with constituents of the respective underlying substrate layer or layers during operation of a gas turbine, for instance.

Formation, elevated temperature behavior of the CMAS resistant overlay coating presented herein and the manifold benefits associated with applying such an overlay coating are explained in the following, especially by the example of a conventional TBC system. However, the following explanations apply analogously where there is no conventional thermal barrier coating, but a TGO layer, for instance, being coated with the CMAS resistant overlay coating:

In general, the CMAS resistant overlay coating according to the first aspect of the invention may be disposed by a physical vapor deposition process on a surface of a substrate comprising or consisting of a material susceptible to CMAS corrosion. Particularly, the overlay coating is disposed on a top layer of a conventional TBC system, i.e. typically on an uppermost surface of a YSZ-based thermal barrier coating. If the overlay coating according to the first aspect of the present invention is disposed on an uppermost surface of a TGO layer, a conventional thermal barrier coating may usually, particularly dependent from the layer thickness of the overlay coating, be dispensed with.

Performing a cathodic arc evaporation (CAE) process as a reactive PVD process, thereby combining thin film deposition or thin film coating, respectively, with a reactive gas plasma, proved to be the best approach, i.e. the most versatile, straight-forward, cost-efficient, energy-saving way, to form and deposit the protective layer according to the first aspect of the invention described herein. In general, depending on the target material, especially its material composition, and the oxygen partial pressure controlled and/or influenced by gas flow controller and the arc current the CMAS resistant overlay coating contains i. a metal oxide matrix comprising Al—O species or Cr—O species or Al—Cr—O species, or a mixture thereof and ii. at least one non-oxidized metallic constituent which is embedded in the metal oxide matrix and selected from the group consisting of aluminum, chromium and metallic constituents comprising or consisting of aluminum and chromium. Notably, formation of the non-oxidized metallic constituents within the metal oxide matrix of the CMAS resistant overlay coating can particularly be influenced and/or controlled by the target material composition, and—to a certain extent—by the oxygen partial pressure controlled and/or influenced by gas flow controller and the arc current. Hence, if desired formation of the intermetallic compounds comprising or consisting of aluminum and chromium can be fostered, for example. After deposition and before exposition to high temperature the herein presented CMAS resistant overlay coating comprises non-oxidized metallic constituents, namely aluminum and/or chromium and/or constituents comprising or consisting of aluminum and chromium, which can be proven by x-ray diffraction (XRD) analysis.

Upon heating at high temperatures, typically around or above 1.000° C., more typically around or above 1.200° C., particularly around or above 1.300° C., droplets of the non-oxidized metallic constituents—embedded in the metal oxide matrix of the CMAS resistant overlay coating, particularly in a lower zone of the overlay coating, and selected from the group consisting of aluminum, chromium and metallic constituents comprising or consisting of aluminum and chromium—diffuse to an uppermost surface of the overlay coating being in contact with the overlying CMAS layer. The metallic constituents consisting of aluminum and chromium, e.g. $Al_8Cr_5$, decompose into their elements, whereby at least a part of them may be oxidized to one or more Al—O compounds and/or Cr—O compounds. The diffusion of chromium and/or aluminum leads to the following results:

1. Self-limiting oxidation of aluminum or non-stoichiometric Al—O species, respectively, resulting in a formation of corundum ($Al_2O_3$) layer in the lower zone of the overlay coating, particularly at and/or nearby an interface between an uppermost region of the conventional thermal barrier coating and an undermost region of the CMAS resistant overlay coating. Advantageously, due to the formation of the corundum layer a volume increase and thus a densification and a closing of grain boundaries within the lower zone of the overlay coating is observed, particularly at and/or nearby the interface between the uppermost region of the conventional thermal barrier coating and the undermost region of the CMAS resistant overlay coating.

2. Modification of the at least partially vertical columnar structure of the protective layer, which is present after deposition before and heating, to a porous, vertical columnar structure upon heating. Beneficially, this leads to strain-tolerant properties and behavior, respectively, of the herein presented overlay coating, particularly at and/or nearby an uppermost surface of the underlying conventional YSZ-based thermal barrier coating. A major advantage of the development of the porous and vertical columnar structure is that—under thermal cycling—not only a very good strain tolerance and thus mechanical stability of the CMAS resistant overlay coating is observed, but also an excellent adherence of the overlay coating to the immediately underlying conventional thermal barrier coating.

3. As the overlay coating being in contact with the CMAS material heated to a temperature above its melting point, for example between around 1.200 and around 1.300° C., a chemical reaction takes place in a reaction zone, i.e. a region between the uppermost region of the overlay coating and the undermost region of the CMAS material. In fact, a chemical reaction takes place between aluminum (Al) and/or chromium (Cr) and/or aluminum chromium (Al—Cr), which have been released by the CMAS resistant overlay coating, and elements and/or constituents of the CMAS material, particularly magnesium (Mg) and/or magnesium oxide (MgO). Thereby an impermeable barrier layer comprising Al—Mg—O species and/or Cr—Mg—O species and/or Al—Cr—Mg—O species is obtained. The barrier layer may also contain $MgAlO_4$ and/or $MgCrO_4$. Beneficially, the barrier layer formed within the reaction zone or being essentially identical to or identical to the reaction zone comprises at least one layer which consists of a material or of a material mixture exhibiting a higher melting temperature than the CMAS material. Thus, the barrier layer serves as an efficient diffusion barrier for the TBC system against infiltration and/or degradation by elements and/or constituents contained in the CMAS layer.

The level of oxygen deficiency and the amount of non-oxidized metallic constituents, respectively, can simply be determined by adjusting the oxygen flow rate during the CAE process. Consequently, the oxidation of aluminum and/or chromium is "self-limiting" in the sense that oxidation is only possible as long as oxygen gas is available. The oxygen volume in turn is determinable as mentioned before.

It is worth mentioning that the lower zone and the upper zone may be formed as two merging regions rather than as two regions strictly separated by a defined interface.

Furthermore, it should be noted that, if a portion of chromium diffused from the CMAS resistant overlay coating does not undergo a chemical reaction with elements and/or constituents of the CMAS melt, the chromium may be oxidized to one or more Cr—O compounds being volatile at the given high temperatures.

Another major benefit of the CMAS resistant overlay coating disclosed herein is that it is suitable to serve as a substitute for a conventional thermal barrier coating, i.e. disposed directly on an uppermost surface of a TGO layer in the absence of a conventional thermal barrier coating, typically based on a YSZ. Besides, the CMAS resistant overlay coating according to the first aspect of the present invention serves as a protecting top layer. This particularly applies for overlay coatings according to the first aspect of the present invention having a minimum layer thickness of about 50 μm, advantageously a layer thickness in the range from about 50 μm to about 300 μm.

Having regard to the foregoing it can be stated that the overlay coating according to the first aspect of the present invention is comparatively inexpensive, versatile and durable, irrespective of surface properties, particularly the surface texture.

According to a preferred embodiment of the overlay coating according to the first aspect of the present invention it is provided that the CMAS resistant overlay coating is rare earth metal-free.

In this context the term "rare earth metal-free" means that the CMAS resistant overlay coating comprises rare earth metals in an amount of 10 atomic percentage at the most, preferably of less than 10 atomic percentage, more preferably of less than 9 atomic percentage, most preferably of less than 8 atomic percentage.

The "atomic percentage", hereinafter abbreviated as at. %, is a measure of the percentage of all rare earth metal atoms comprised in the overlay coating composition, relative to the total number of atoms.

A further embodiment of the overlay coating presented herein provides that the metal oxide matrix comprises at least one oxidic species containing aluminum and/or chromium. In another embodiment of the overlay coating according to the first aspect of the present invention the metal oxide matrix comprises an oxidic species selected from the group consisting of Al—O species, Cr—O species and Al—Cr—O species, and mixtures thereof. Advantageously, the metal oxide matrix comprises an oxidic species selected from the group consisting of non-stoichiometric, oxygen deficient aluminum oxide, non-stoichiometric, oxygen deficient chromium oxide and non-stoichiometric, oxygen deficient aluminum chromium oxide, aluminum oxide $(Al_2O_3)$, chromium oxide $(Cr_2O_3)$ and aluminum chromium oxide $(Al,Cr)_2O_3$, and mixtures thereof.

The non-stoichiometric oxygen species exhibit a non-stoichiometric ratio between aluminum and/or chromium and oxygen. In other words, the non-stoichiometric, oxygen deficient aluminum oxide comprises a combination of aluminum oxide $(Al_2O_3)$ and aluminum, i.e. a surplus of aluminum. This analogously applies to non-stoichiometric, oxygen deficient chromium oxide. In case of non-stoichiometric, oxygen deficient aluminum chromium oxide a combination of aluminum chromium oxide $(Al,Cr)_2O_3$ and chromium and/or aluminum is present.

The level of oxygen deficiency and the amount of non-oxidized metallic constituents, respectively, can simply be determined by adjusting the oxygen flow rate during the CAE process.

A further embodiment of the overlay coating according to the first aspect of the invention described herein provides that the CMAS resistant overlay coating comprises a lower zone and an upper zone. In this case, the lower zone comprises an oxidic species selected from the group consisting of non-stoichiometric, oxygen deficient aluminum oxide, non-stoichiometric, oxygen deficient chromium oxide and non-stoichiometric, oxygen deficient aluminum chromium oxide, and mixtures thereof. And the upper zone comprises—usually in addition to an oxidic species selected from the group consisting of non-stoichiometric, oxygen deficient aluminum oxide, non-stoichiometric, oxygen deficient chromium oxide and non-stoichiometric, oxygen deficient aluminum chromium oxide, and mixtures thereof,—a stoichiometric oxidic species selected from the group consisting of aluminum oxide $(Al_2O_3)$, chromium oxide $(Cr_2O_3)$ and aluminum chromium oxide $(Al, Cr)_2O_3$, and mixtures thereof, or a mixture of at least one of the aforementioned non-stoichiometric oxides and at least one of the aforementioned stoichiometric oxides.

According to another embodiment of the overlay coating according to the first aspect of the present invention the metallic constituents comprising or consisting of aluminum and chromium are independently of each other in the form of alloys, intermetallic compounds or solid solutions. Advantageously, it is provided that the metallic constituents comprising or consisting of aluminum and chromium comprise or consist of $Al_1Cr_2$ or $Al_8Cr_5$, or a combination or a mixture thereof.

Another preferred embodiment of the herein presented overlay coating provides that non-oxidized aluminum and/or non-oxidized chromium and/or non-oxidized aluminum chromium are in the form of metal droplets.

In a further embodiment of the overlay coating according to the first aspect of the present invention the overlay coating is capable of providing elemental aluminum and/or elemental chromium and/or aluminum chromium at a temperature in the range from 1.000° C. to 1.600° C., advantageously in the range from 1.100° C. to 1.500° C., more advantageously in the range from 1.150° C. to 1.450° C.

According to another important embodiment of the overlay coating according to the first aspect of the invention described herein the vertical columnar structure of the CMAS resistant overlay coating extends partially through a thickness of the CMAS resistant overlay coating, advantageously through about 50% or more of the thickness, or through the essentially entire or the entire thickness of the CMAS resistant overlay coating and/or partially across a width of the CMAS resistant overlay coating or across the essentially entire or the entire width of the CMAS resistant overlay coating.

In case the vertical columnar structure extends only partially through the thickness of the CMAS resistant overlay coating, the vertical structure might—at least in sections—be interrupted in vertical direction. In case the vertical columnar structure extends only partially across the width of the CMAS resistant overlay coating the vertical structure might—at least in sections—be interrupted in horizontal direction.

Another embodiment of the overlay coating according the first aspect of the present invention provides that the CMAS resistant overlay coating has a layer thickness in the range from 5 μm to 300 μm, advantageously in the range from 10 μm to 250 μm, more advantageously in the range from 15 μm to 150 μm, particularly in the range from 20 μm to 100 μm.

In a further embodiment of the overlay coating according to the first aspect of the present invention the CMAS resistant overlay coating serves as a top layer on a conventional, particularly YSZ-based, thermal barrier coating. Then a minimum layer thickness of the overlay coating of about 5 μm is required. Advantageously, the CMAS resistant overlay coating has a layer thickness in the range from 5 μm to 49 μm, more advantageously in the range from 5 μm to 45 μm, preferably in the range from 5 μm to 40 μm. For instance, the overlay coating has a layer thickness in the range from 10 μm to 35 μm or in the range from 15 μm to 30 μm. The overlay coating may also have a layer thickness of 6 μm or 7 μm or 8 μm or 9 μm or 11 μm or 12 μm or 13 μm or 14 μm or 16 μm or 17 μm or 18 μm or 19 μm or 20 μm or 21 μm or 22 μm or 23 μm or 24 μm or 25 μm or 26 μm or 27 μm or 28 μm or 29 μm or 31 μm or 32 μm or 33 μm or 34 μm or 36 μm or 37 μm or 38 μm or 39 μm or 41 μm or 42 μm or 43 μm or 44 μm or 46 μm or 47 μm or 48 μm.

Another important embodiment of the overlay coating according to the first aspect of the present invention provides that the CMAS resistant overlay coating i. has a layer thickness in the range from 50 μm to 300 μm, and ii. serves both as a thermal barrier coating and as a top layer.

Beneficially, this embodiment of the CMAS resistant overlay coating according to the first aspect of the present invention provides that the overlay coating is used as a substitute for a conventional, typically YSZ-based, thermal barrier coating and, in addition, as a protecting top layer. Thus, the overlay coating is applied in the absence of a conventional thermal barrier coating, i.e. without an underlying conventional thermal barrier coating, however, usually with an underlying TGO layer. Advantageously, even though the layer thickness is in the range from 50 μm to 300 μm the CMAS resistant overlay coating is quite cost-efficient as only comparatively cheap aluminum and/or chromium are required instead of cost-intensive rare earth metals. Another major benefit over the prior art is that the overlay coating exhibits a very good mechanical stability and excellent adherence to the underlying layer, which is usually a TGO layer, under thermal cycling, even if temperatures of 1.500° C. or more, particularly up to 1.600° C., are applied.

Another embodiment of the overlay coating provides that the CMAS resistant overlay coating serves both as a thermal barrier coating and as a top layer and has a layer thickness in the range from 50 μm to 295 μm, more advantageously in the range from 50 μm to 150 μm, preferably in the range from 50 μm to 100 μm. For instance, the overlay coating has a layer thickness in the range from 55 μm to 95 μm or in the range from 60 μm to 90 μm. The overlay coating may also have a layer thickness of 65 μm or 70 μm or 75 μm or 80 μm or 85 μm or 105 μm or 110 μm or 115 μm or 120 μm or 125 μm or 130 μm or 135 μm or 140 μm or 145 μm or 155 μm or 160 μm or 165 μm or 170 μm or 175 μm or 180 μm or 185 μm or 190 μm or 200 μm or 205 μm or 210 μm or 215 μm or 220 μm or 225 μm or 230 μm or 235 μm or 240 μm or 245 μm or 250 μm or 255 μm or 260 μm or 265 μm or 270 μm or 275 μm or 280 μm or 285 μm or 290 μm.

According to a second aspect of the present invention the problem is solved by a substrate comprising or consisting of a material susceptible to CMAS corrosion, wherein the substrate i. comprises or consists of at least one substrate layer comprising or consisting of a material susceptible to CMAS corrosion, and ii. has a CMAS resistant overlay coating on a surface of at least one of the substrate layers.

Particularly, at least one of the overlay coatings is a CMAS resistant overlay coating according to one or more of the above-described embodiments, in the context of the first aspect of the present invention. In case more than one overlay coatings are provided preferably all of them are CMAS resistant overlay coatings according to one or more of the above-described embodiments. Thereby, each of the overlay coatings is particularly formed and deposited, respectively, by applying the process according to a third aspect of this invention which is described below.

Irrespective of whether or not the overlay coating is formed and deposited, respectively, by the process according to one or more embodiments of the process described below, the CMAS resistant overlay coating i. comprises a metal oxide matrix, wherein at least one non-oxidized metallic constituent selected from the group consisting of aluminum, chromium and metallic constituents comprising or consisting of aluminum and chromium is embedded in the metal oxide matrix, and ii. has at least partially a vertical columnar structure.

Within the scope of the present invention the terms "CMAS resistant overlay coating" and "overlay coating" and "protective layer" are used synonymously.

The terms "surface", "layer" and "thermal barrier coating system" are as defined above, in connection with the first aspect of the present invention.

The "material susceptible to CMAS corrosion" is as defined above, in the context of the first aspect of the present invention.

The metal oxide matrix may comprise one or more stoichiometric metal oxides and/or one or more non stoichiometric, particularly oxygen deficient, metal oxides.

Details concerning formation and elevated temperature behavior of the CMAS resistant overlay coating disposed on the surface of at least one layer of the substrate described herein as well as concerning the manifold benefits associated with applying such an overlay coating, particularly according to one or more of the above-described embodiments, are elaborated above, in the context of the first aspect of this invention, and below, in connection with the third aspect of the present invention.

Surprisingly, under thermal cycling, the CMAS resistant overlay coating, particularly according to the first aspect of the present invention, disposed on a surface of a substrate, i.e. on a surface of at least one of the substrate layers, comprising or consisting of a material susceptible to CMAS corrosion exhibits very good mechanical stability and excellent adherence to the immediately underlying material surface, even if temperatures of 1.500° C. or more, particularly up to 1.600° C., are applied. This particularly results from the formation of an impermeable barrier layer with the participation of non-oxidized metallic constituents diffused from the CMAS resistant overlay coating to an interface between the overlay coating and the immediately overlying molten CMAS material, as described in the following:

The overlay coating is capable of releasing the comprised non-oxidized metallic constituents, i.e. aluminum and/or chromium and/or a metallic constituent comprising or consisting of aluminum and chromium, embedded in the metal oxide matrix, at elevated temperatures, i.e. upon heating at high temperatures of about 1.000° C. or more. Then, in brief, the non-oxidized metallic constituents diffuse to an uppermost surface of the CMAS resistant overlay coating and an undermost surface of the liquid CMAS layer, respectively, and undergo a reaction with elements and/or constituents of the CMAS material, e.g. calcium, magnesium, magnesium oxide and silicon. Thereby, an impermeable barrier layer is formed which has a higher melting temperature than CMAS materials, thus effectively inhibiting liquid CMAS materials from infiltrating the respective underlying substrate layers, e.g. a TBC system, and/or from reacting with constituents of the respective underlying substrate layers during operation of a gas turbine, for instance.

In an important embodiment of the substrate according to the second aspect of the present invention the material susceptible to CMAS corrosion is selected from the group consisting of metals, superalloys, ceramic materials and ceramic matrix composites (CMCs), and combinations thereof. Alternatively or as complement at least one of the substrate layers comprises or consists of a CMC comprising or consisting of a SiC-based CMC.

According to another embodiment of the substrate according to the second aspect of the invention described herein the substrate comprises or consists of a base layer, particularly a metal or a metal alloy, e.g. a superalloy, and a thermal barrier coating (TBC) system comprising a YSZ-based thermal barrier coating disposed on a thermally grown oxide (TGO) layer.

In a complementary embodiment of the substrate the TBC system comprises a bond coat (BC) layer disposed between the base layer and the TGO layer.

An alternative embodiment provides that the substrate comprises or consists of a base layer, particularly a metal or a metal alloy, e.g. a superalloy,
and
a bond coat (BC) layer and a TGO layer, wherein the BC layer is disposed between the base layer and the TGO layer.

A further embodiment of the substrate according to the second aspect of the present invention provides that the base layer is a part of a turbine, particularly of a gas turbine, e.g. a turbine blade, a turbine inlet of a combustion chamber, particularly of a high-pressure turbine.

Still another embodiment of the substrate according to the second aspect of the invention described herein provides that the BC layer comprises or consists of a material selected from the group consisting of NiCoCrAlY, Pt-modified diffusion aluminides and glass-ceramics. Alternatively, it may be provided that the BC layer comprises a material selected from the group consisting of NiCoCrAlY and Pt-modified diffusion aluminides.

According to a preferred embodiment of the substrate disclosed herein it is provided that the CMAS resistant overlay coating is rare earth metal-free. That means that the CMAS resistant overlay coating comprises rare earth metals in an amount of 10 atomic percentage at the most, preferably of less than 10 atomic percentage, more preferably of less than 9 atomic percentage, most preferably of less than 8 atomic percentage.

The term "atomic percentage" is as defined above.

Another embodiment of the substrate according to the second aspect of the invention described herein provides that the metal oxide matrix comprised in the CMAS resistant overlay coating comprises at least one oxidic species containing aluminum and/or chromium. In another embodiment of the substrate the metal oxide matrix comprises an oxidic species selected from the group consisting of Al—O species, Cr—O species and Al—Cr—O species, and mixtures thereof. Advantageously, the metal oxide matrix comprises an oxidic species selected from the group consisting of non-stoichiometric, oxygen deficient aluminum oxide, non-stoichiometric, oxygen deficient chromium oxide and non-stoichiometric, oxygen deficient aluminum chromium oxide, aluminum oxide ($Al_2O_3$), chromium oxide ($Cr_2O_3$) and aluminum chromium oxide ($(Al,Cr)_2O_3$), and mixtures thereof.

The non-stoichiometric oxygen species exhibit a non-stoichiometric ratio between aluminum and/or chromium and oxygen. In other words, the non-stoichiometric, oxygen deficient aluminum oxide comprises a combination of aluminum oxide ($Al_2O_3$) and aluminum, i.e. a surplus of aluminum. This analogously applies to non-stoichiometric, oxygen deficient chromium oxide. In case of non-stoichiometric, oxygen deficient aluminum chromium oxide a combination of aluminum chromium oxide ($(Al,Cr)_2O_3$ and chromium and/or aluminum is present.

The level of oxygen deficiency and the amount of non-oxidized metallic constituents, respectively, can simply be determined by adjusting the oxygen flow rate during the CAE process.

Still another embodiment of the substrate according to the second aspect of the present invention provides that the CMAS resistant overlay coating comprises a lower zone and an upper zone. In this case, the lower zone comprises an oxidic species selected from the group consisting of non-stoichiometric, oxygen deficient aluminum oxide, non-stoichiometric, oxygen deficient chromium oxide and non-stoichiometric, oxygen deficient aluminum chromium oxide, and mixtures thereof. And the upper zone comprises— usually in addition to an oxidic species selected from the group consisting of non-stoichiometric, oxygen deficient aluminum oxide, non-stoichiometric, oxygen deficient chromium oxide and non-stoichiometric, oxygen deficient aluminum chromium oxide, and mixtures thereof—a stoichiometric oxidic species selected from the group consisting of aluminum oxide ($Al_2O_3$), chromium oxide ($Cr_2O_3$) and aluminum chromium oxide ($(Al, Cr)_2O_3$, and mixtures thereof, or a mixture of at least one of the aforementioned non stoichiometric oxides and at least one of the aforementioned stoichiometric oxides.

The lower zone and the upper zone may be formed as two merging regions rather than as two regions strictly separated by a defined interface.

According to a further embodiment of the substrate according to the second aspect of the invention presented herein the metallic constituents comprising or consisting of aluminum and chromium are independently of each other in the form of alloys, intermetallic compounds or solid solutions. In an advantageous embodiment it is provided that the non-oxidized metallic constituents comprising or consisting of aluminum and chromium, which are embedded in the metal oxide matrix of the CMAS resistant overlay coating, comprise or consist of $Al_1Cr_2$ or $Al_8Cr_5$, or a combination or a mixture thereof.

Another preferred embodiment of the substrate disclosed herein provides that non-oxidized aluminum and/or non-oxidized chromium and/or non-oxidized aluminum chromium are in the form of metal droplets.

In another embodiment of the substrate according to the second aspect of the present invention the overlay coating is capable of providing elemental aluminum and/or elemental chromium and/or aluminum chromium at a temperature in the range from 1.000° C. to 1.600° C., advantageously in the range from 1.100° C. to 1.500° C., more advantageously in the range from 1.150° C. to 1.450° C.

According to another important embodiment of the substrate according to the second aspect of the invention described herein the vertical columnar structure of the CMAS resistant overlay coating extends
partially through a thickness of the CMAS resistant overlay coating, advantageously through about 50% or more of the thickness, or through the essentially entire or the entire thickness of the CMAS resistant overlay coating,
and/or
partially across a width of the CMAS resistant overlay coating or across the essentially entire or the entire width of the CMAS resistant overlay coating.

In case the vertical columnar structure extends only partially through the thickness of the CMAS resistant overlay coating, the vertical structure might—at least in sections—be interrupted in vertical direction. In case the vertical columnar structure extends only partially across the width of the CMAS resistant overlay coating the vertical structure might—at least in sections—be interrupted in horizontal direction.

Another embodiment of the substrate according to the second aspect of the present invention provides that the CMAS resistant overlay coating has a layer thickness in the range from 5 μm to 300 μm, advantageously in the range from 10 μm to 250 μm, more advantageously in the range from 15 μm to 150 μm, particularly in the range from 20 μm to 100 μm.

In a further embodiment of the substrate according to the second aspect of the present invention the CMAS resistant overlay coating serves as a top layer on a conventional, particularly YSZ-based, thermal barrier coating. Then a minimum layer thickness of the overlay coating of about 5 μm is required. Advantageously, the CMAS resistant overlay coating has a layer thickness in the range from 5 μm to 49 μm, more advantageously in the range from 5 μm to 45 μm, preferably in the range from 5 μm to 40 μm. For instance, the overlay coating has a layer thickness in the range from 10 μm to 35 μm or in the range from 15 μm to 30 μm. The overlay coating may also have a layer thickness of 6 μm or 7 μm or 8 μm or 9 μm or 11 μm or 12 μm or 13 μm or 14 μm or 16 μm or 17 μm or 18 μm or 19 μm or 20 μm or 21 μm or 22 μm or 23 μm or 24 μm or 25 μm or 26 μm or 27 μm or 28 μm or 29 μm or 31 μm or 32 μm or 33 μm or 34 μm or 36 μm or 37 μm or 38 μm or 39 μm or 41 μm or 42 μm or 43 μm or 44 μm or 46 μm or 47 μm or 48 μm.

Another important embodiment of the substrate according to the second aspect of the present invention provides that the CMAS resistant overlay coating i. has a layer thickness in the range from 50 μm to 300 μm, and ii. serves both as a thermal barrier coating and as a top layer.

Beneficially, this embodiment of the substrate according to the second aspect of the present invention provides that the overlay coating is used as a substitute for a conventional, typically YSZ-based, thermal barrier coating, and, in addition, as a protecting top layer. Thus, the overlay coating is applied in the absence of a conventional thermal barrier coating, i.e. without an underlying conventional thermal barrier coating. Advantageously, even though the layer thickness is in the range from 50 μm to 300 μm the CMAS resistant overlay coating is quite cost-efficient as only comparatively cheap aluminum and/or chromium are required instead of cost-intensive rare earth metals. Another major benefit over the prior art is that the overlay coating exhibits a very good mechanical stability and excellent adherence to the underlying layer, which is typically a TGO layer, under thermal cycling, even if temperatures of 1.500° C. or more, particularly up to 1.600° C., are applied.

Another embodiment of the substrate according to the second aspect of the present invention provides that the CMAS resistant overlay coating serves both as a thermal barrier coating and as a top layer and has a layer thickness in the range from 50 μm to 295 μm, more advantageously in the range from 50 μm to 150 μm, preferably in the range from 50 μm to 100 μm. For instance, the overlay coating has a layer thickness in the range from 55 μm to 95 μm or in the range from 60 μm to 90 μm. The overlay coating may also have a layer thickness of 65 μm or 70 μm or 75 μm or 80 μm or 85 μm or 105 μm or 110 μm or 115 μm or 120 μm or 125 μm or 130 μm or 135 μm or 140 μm or 145 μm or 155 μm or 160 μm or 165 μm or 170 μm or 175 μm or 180 μm or 185 μm or 190 μm or 200 μm or 205 μm or 210 μm or 215 μm or 220 μm or 225 μm or 230 μm or 235 μm or 240 μm or 245 μm or 250 μm or 255 μm or 260 μm or 265 μm or 270 μm or 275 μm or 280 μm or 285 μm or 290 μm.

Altogether, it can be stated that the substrate disclosed herein is particularly durable as it has a CMAS resistant overlay coating on a surface, particularly on its uppermost surface. The overlay coating's behavior at high temperatures leads to formation of an impermeable barrier layer efficiently protecting the respective underlying substrate comprising a TBC system, for instance, against infiltration and/or degradation by liquid CMAS material. Thus, the application of a CMAS resistant overlay coating, advantageously according to one or more of the above-described embodiments, is particularly beneficial, both from an economical and an ecological point of view.

According to a third aspect of the present invention the problem is solved by a cathodic arc evaporation (CAE) process for forming a CMAS resistant overlay coating on a surface of a substrate comprising or consisting of a material susceptible to CMAS corrosion, the overlay coating comprising at least one CMAS resistant layer. The process comprises the steps of:

A. providing a target for use as a cathodic material, wherein a target material comprises or consists of aluminum and/or chromium, B. providing a process gas comprising or consisting of oxygen, C. evaporating aluminum and/or chromium from the target material provided in step A., D. reacting the evaporated aluminum and/or chromium evaporated in step C. with the process gas provided in step B., and E. depositing the reaction product of step D. as a CMAS resistant overlay coating on a surface of the substrate, i.e. on a surface of at least one substrate layer, comprising or consisting of a material susceptible to CMAS corrosion, particularly until the CMAS resistant overlay coating has a desired layer thickness.

The terms "CMAS resistant overlay coating" and "overlay coating" and "protective layer" are used synonymously.

The terms "surface", "material susceptible to CMAS corrosion" and "substrate comprising or consisting of a material susceptible to CMAS corrosion" are as defined above.

Within the scope of the present invention the term "layer" is synonymous with the term "film" and does not provide any information on the layer thickness or film thickness. Besides, a layer does not necessarily have a uniform thickness. However, in case a layer thickness is specified, this layer thickness shall be present at least in sections of the respective layer, namely as its maximum thickness.

The process according to the third aspect of the present invention provides that the formation and deposition, respectively, of a CMAS resistant overlay coating, particularly of an overlay coating according one or more embodiments according to the first aspect of the present invention, is conducted by means of the CAE method. The latter is performed as a reactive physical vapor deposition (PVD) process combining thin film deposition or thin film coating, respectively, with a reactive gas plasma in an arc evaporator. The latter usually comprises a target material operable as cathode during arc evaporation. In addition, the arc evaporator may also comprise at least one electrode operable as anode during arc evaporation. The arc evaporator is arranged in a vacuum chamber of a coating apparatus. For execution of a CAE process normally means are used for igniting a high current discharge, establishing a plasma and forming an arc with a spot moving across the surface of the target, thereby tearing electrons out of the target material, more precisely out of the surface of the target material. Due to the heat created at the spot the target material is evaporated and atomized, respectively, and deposited on a surface provided for this purpose. Therefore, the arc evaporator is also named coating source or plasma source. The terms "evaporator", "coating source" and "plasma source" are commonly used as synonyms.

When applying the process according to the third aspect of the present invention the formation of the metal oxide matrix comprised in the CMAS resistant overlay coating according to the first aspect of the present invention is achieved by performing the CAE as a reactive PVD process.

In step C. of this process the metallic constituents, i.e. aluminum and/or chromium, are evaporated from a single elemental target material consisting of aluminum or chromium or from a multi elemental target material having been provided in step A. and comprising or consisting of aluminum and chromium. Step D. provides that the evaporated aluminum and/or chromium is reacted with a process gas comprising or consisting of oxygen being introduced into the coating chamber in step D. As a result, in step. E the reaction product of step D., a ceramic oxide material, is deposited as a CMAS resistant overlay coating on a surface of the substrate comprising or consisting of a material susceptible to CMAS corrosion, particularly on an uppermost surface of the substrate.

It should be mentioned that step B. and step C. do not have to be conducted as separate steps, but may instead be comprised in step D. However, in case step B. and step C. are carried out in two steps the stated sequence is not mandatory. Furthermore, it is clear from the very nature of the CAE process described herein that step B., step C., step D. and step E. shall be repeated until an overlay coating having the desired layer thickness is formed on the respective surface of the substrate, i.e. on a surface of at least one of the substrate layers, comprising or consisting of a material susceptible to CMAS corrosion. It is obvious that the reaction product of step. D., particularly including step B. and step C., may be deposited according to step E. and at the same time the reaction according to step D. may take place again.

In brief, it is a major benefit of the process according to the third aspect of the present invention that a CMAS resistant overlay coating is obtainable, which is capable of providing elemental aluminum and/or elemental chromium and/or aluminum chromium at a temperature in the range from 1.000° C. to 1.600° C., advantageously in the range from 1.100° C. to 1.500° C., more advantageously in the range from 1.150° C. to 1.550° C.

In general, depending on the target material, especially its material composition, and the oxygen partial pressure controlled and/or influenced by gas flow controller and the arc current the CMAS resistant overlay coating contains i. a metal oxide matrix, particularly comprising at least one oxidic species containing aluminum and/or chromium, more particularly an oxidic species selected from the group consisting of Al—O species and/or Cr—O species and/or Al—Cr—O species, and ii. at least one non-oxidized metallic constituent which is embedded in the metal oxide matrix and selected from the group consisting of aluminum, chromium and metallic constituents comprising or consisting of aluminum and chromium.

In particular, the metal oxide matrix comprises an oxidic species selected from the group consisting of non-stoichiometric, oxygen deficient aluminum oxide, non-stoichiometric, oxygen deficient chromium oxide and non-stoichiometric, oxygen deficient aluminum chromium oxide, aluminum oxide ($Al_2O_3$), chromium oxide ($Cr_2O_3$) and aluminum chromium oxide ($Al,Cr)_2O_3$, or a mixture thereof.

Thereby, the non-stoichiometric oxygen species exhibit a non-stoichiometric ratio between aluminum and/or chromium and oxygen. In other words, the non-stoichiometric, oxygen deficient aluminum oxide comprises a combination of aluminum oxide and aluminum, i.e. a surplus of aluminum. This analogously applies to non-stoichiometric, oxygen deficient chromium oxide. In case of non-stoichiometric, oxygen deficient aluminum chromium oxide a combination of aluminum chromium oxide and chromium and/or aluminum is present.

Within the CMAS resistant layer, deposited in step E., the non-oxidized metallic constituents comprising or consisting of aluminum and chromium are independently of each other in the form of alloys, intermetallic compounds or solid solutions. Particularly, non-oxidized aluminum, non-oxidized chromium and non-oxidized metallic constituents comprising or consisting of aluminum and chromium are in the form of metal droplets.

Advantageously, the non-oxidized metallic constituents comprising or consisting of aluminum and chromium comprise or consist of $Al_1Cr_2$ or $Al_8Cr_5$, or a combination or mixture thereof.

Advantageously, the CMAS resistant overlay coating, which is deposited in step E., usually comprises a lower zone and an upper zone. Then the lower zone comprises an oxidic species selected from the group consisting of non-stoichiometric, oxygen deficient aluminum oxide, non-stoichiometric, oxygen deficient chromium oxide and non-stoichiometric, oxygen deficient aluminum chromium oxide, and mixtures thereof. And the upper zone comprises-usually in addition to an oxidic species selected from the group consisting non-stoichiometric, oxygen deficient aluminum oxide, non-stoichiometric, oxygen deficient chromium oxide and non-stoichiometric, oxygen deficient aluminum chromium oxide, and mixtures thereof-a stoichiometric oxidic species selected from the group of aluminum oxide ($Al_2O_3$), chromium oxide ($Cr_2O_3$) and aluminum chromium oxide ($Al, Cr)_2O_3$, or a mixture of at least one of the aforementioned non-stoichiometric oxides and at least one of the aforementioned stoichiometric oxides.

The above-mentioned intermetallic compounds or solid solutions are yielded according to the Al—Cr phase diagram, wherein their compositions depend on the respective target material. For instance, in case of a target material $Al_{70}Cr_{30}$ (70 at. % Al and 30 at. % Cr), metal droplets of $Al_8Cr_5$ can be detected in the CMAS resistant overlay coating, which—in accordance with the Al—Cr binary phase diagram—shows a transition to liquid phase at about 1.300° C. Alternatively or as a complement, particularly if a target composition of $Al_{50}Cr_{50}$ (50 at. % Al and 50 at. % Cr) is chosen, metal droplets with a higher chromium content and thus a higher transition temperature to liquid phase, e.g. $Al_1Cr_2$, can be detected in the CMAS resistant overlay coating after its deposition, namely by XRD analysis. At high temperatures of about 1.300° C. an aluminum chromium metallic constituent having one of the aforementioned compositions, for example, starts to decompose into its elements, whereby at least a part of them may be oxidized to one or more Al—O compounds and/or Cr—O compounds. This is a major difference compared to pure aluminum droplets or metal droplets containing a substantially larger atomic percentage of aluminum than of chromium. The latter show a higher thermal stability at the aforementioned temperature. Decomposition of the aluminum chromium constituents goes along with a diffusion of chromium towards an uppermost surface of the CMAS resistant overlay coating. If a portion of the chromium does not undergo a reaction with constituents and/or elements contained in the CMAS material being in contact with the CMAS resistant overlay coating the chromium may be oxidized to one or more Cr—O compounds being volatile at high temperatures.

One embodiment of the process according to the third aspect of the present invention provides that the target material comprises or consists of aluminum and/or chromium, wherein chromium is comprised in an amount of at least 15 atomic percentage, advantageously in an amount of at least 20 atomic percentage, particularly in an amount of at least 25 atomic percentage.

A further embodiment of the process according to the third aspect of the present invention provides that the target material i. consists essentially of aluminum and chromium, or ii. consists entirely of aluminum and chromium.

The "atomic percentage", abbreviated as at. %, is a measure of the percentage of one kind of atom, here chromium, relative to the total number of atoms, i.e. aluminum and chromium, for instance, in case the target material consists entirely of aluminum and chromium. If the target material consists essentially of aluminium and chromium, these two elements are comprised in the target material in an amount of at least 97 at. %, preferably in an amount of at least 98 at. %, more preferably in an amount of at least 99 at. %.

Preferably, the target material is rare earth metal-free in the sense that only traces of rare earth metals may be present in the target material. The term "traces" means amounts below the threshold values of the relevant analytical methods, e.g. inductively coupled plasma atomic emission spectroscopy (ICP-AES).

In a further embodiment of the process according to the third aspect of the present invention a partial pressure of oxygen is in the range from 0.001 Pa to 10 Pa.

Advantageously, simply by adjusting the oxygen flow rate during the CAE process according to the third aspect of the present invention the level of oxygen deficiency of the non-stoichiometric, oxygen deficient metal oxides, especially non-stoichiometric, oxygen deficient aluminum oxide and/or non-stoichiometric, oxygen deficient chromium oxide and/or non-stoichiometric, oxygen deficient aluminum chromium oxide, and the amount of non-oxidized metallic constituents, respectively, which are contained in the CMAS resistant overlay coating being deposited in step E., can be determined.

In a preferred embodiment of the process according to the third aspect of the invention a CMAS resistant overlay coating according to one or more embodiments of the first aspect of the present invention is deposited in step E. on a surface of the substrate comprising or consisting of a material susceptible to CMAS corrosion. Thereby, the CMAS resistant overlay coating is preferably deposited on a substrate according to one or more embodiments according to the second aspect of the present invention.

In particular, the CMAS resistant overlay coating, which is deposited in step E. of the process described herein, i. comprises at least one CMAS resistant layer, ii. comprises a metal oxide matrix, wherein at least one non-oxidized metallic constituent selected from the group consisting of aluminum, chromium and metallic constituents comprising or consisting of aluminum and chromium is embedded in the metal oxide matrix, and iii. has at least partially a vertical columnar structure.

Advantageously, the vertical columnar structure of the CMAS resistant overlay coating, which is deposited in step E., usually extends partially through a thickness of the CMAS resistant overlay coating, advantageously through about 50% or more of the thickness, or through the essentially entire or the entire thickness of the CMAS resistant overlay coating and/or partially across a width of the CMAS resistant overlay coating or across the essentially entire or the entire width of the CMAS resistant overlay coating.

In case the vertical columnar structure extends only partially through the thickness of the CMAS resistant overlay coating, the vertical structure might—at least in sections—be interrupted in vertical direction. In case the vertical columnar structure extends only partially across the width of the CMAS resistant overlay coating the vertical structure might—at least in sections—be interrupted in horizontal direction.

In another embodiment of the process according the third aspect of the present invention step E. is conducted until the CMAS resistant overlay coating has a layer thickness in the range from 5 μm to 300 μm, advantageously in the range from 10 μm to 250 μm, more advantageously in the range from 15 μm to 150 μm, particularly in the range from 20 μm to 100 μm.

In a further embodiment of the process according to the third aspect of the present invention, in step E., the CMAS resistant overlay coating is especially deposited on a surface of a conventional, particularly YSZ-based, thermal barrier coating in order to serve as a top layer on such a thermal barrier coating. Particularly, the CMAS resistant overlay coating is deposited on an uppermost surface of the thermal barrier coating. In the aforementioned cases step E. is conducted until the CMAS resistant overlay coating has a layer thickness of about 5 μm. Advantageously, step E. is conducted until the CMAS resistant overlay coating has a layer thickness in the range from 5 μm to 49 μm, more advantageously in the range from 5 μm to 45 μm, preferably in the range from 5 μm to 40 μm. For instance, step E. is conducted until the overlay coating has a layer thickness in the range from 10 μm to 35 μm or in the range from 15 μm to 30 μm. The overlay coating may also have a layer thickness of 6 μm or 7 μm or 8 μm or 9 μm or 11 μm or 12 μm or 13 μm or 14 μm or 16 μm or 17 μm or 18 μm or 19 μm or 20 μm or 21 μm or 22 μm or 23 μm or 24 μm or 25 μm or 26 μm or 27 μm or 28 μm or 29 μm or 31 μm or 32 μm or 33 μm or 34 μm or 36 μm or 37 μm or 38 μm or 39 μm or 41 μm or 42 μm or 43 μm or 44 μm or 46 μm or 47 μm or 48 μm.

Another alternative or complementary embodiment of the process according to the third aspect of the present invention provides that, in step E., the CMAS resistant overlay coating is deposited on a surface of a thermally grown oxide layer and has a layer thickness in the range from 50 μm to 300 μm. Particularly, the CMAS resistant overlay coating is deposited on an uppermost surface of the TGO layer. In the aforementioned cases step E. the CMAS resistant overlay coating serves both as a thermal barrier coating and as a protecting top layer. Beneficially, the overlay coating is used as a substitute for a conventional, typically YSZ-based, thermal barrier coating, and, in addition, as a protecting top layer. Thus, the overlay coating is applied in the absence of a conventional thermal barrier coating, i.e. without an underlying conventional thermal barrier coating. Advantageously, even though the layer thickness is in the range from 50 μm to 300 μm the CMAS resistant overlay coating, obtainable according to one or more embodiments of the straightforward, relatively cost-efficient and energy-saving process described herein, is quite cost-efficient as only comparatively cheap aluminum and/or chromium are required instead of cost-intensive rare earth metals. Another major benefit over the prior art is that the overlay coating exhibits a very good mechanical stability and excellent adherence to the underlying layer, which is usually a TGO layer, under thermal cycling, even if temperatures of 1.500° C. or more, particularly up to 1.600° C., are applied.

Another embodiment of the process provides that step E. is conducted until the CMAS resistant overlay coating has a layer thickness in the range from 50 μm to 250 μm, more advantageously in the range from 50 μm to 150 μm, preferably in the range from 50 μm to 100 μm. For instance, step E. is conducted until the overlay coating has a layer thickness in the range from 55 μm to 95 μm or in the range from 60 μm to 90 μm. The overlay coating may also have a layer thickness of 65 μm or 70 μm or 75 μm or 80 μm or 85 μm or 105 μm or 110 μm or 115 μm or 120 μm or 125 μm or 130 μm or 135 μm or 140 μm or 145 μm or 155 μm or 160 μm or 165 μm or 170 μm or 175 μm or 180 μm or 185 μm or 190 μm or 200 μm or 205 μm or 210 μm or 215 μm or 220 μm or 225 μm or 230 μm or 235 μm or 240 μm or 245 μm or 260 μm or 265 μm or 270 μm or 275 μm or 280 μm or 285 μm or 290 μm or 295 μm.

According to another embodiment of the process according to the third aspect of the present invention the substrate comprising or consisting of a material susceptible to CMAS corrosion comprises or consists of at least one substrate layer. Thereby at least one of the substrate layers comprises or consists of a material susceptible to CMAS corrosion. Typically, the material susceptible to CMAS corrosion is selected from the group consisting of metals, superalloys, ceramic materials and ceramic matrix composites (CMCs), and combinations thereof. Alternatively or as complement at least one of the substrate layers comprises or consists of a CMC comprising or consisting of a SiC-based CMC.

A further embodiment of the process according to the third aspect of the present invention provides that the substrate comprises or consists of
a base layer
and
    a thermal barrier coating (TBC) system comprising a YSZ-based thermal barrier coating disposed on a thermally grown oxide (TGO) layer.

In a complementary embodiment of the process the TBC system contained in the substrate comprises a bond coat (BC) layer disposed between the base layer and the TGO layer.

An alternative embodiment of the process according to the third aspect of the present invention provides that the substrate comprises or consists of
a base layer
and
    a bond coat (BC) layer and a TGO layer, wherein the BC layer is disposed between the base layer and the TGO layer.

A further embodiment of the process according to the third aspect of the present invention provides that the substrate's base layer is a part of a turbine, particularly of a gas turbine, e.g. a turbine blade, a turbine inlet of a combustion chamber, particularly of a high-pressure turbine.

Still another embodiment of the process according to the third aspect of the invention described herein provides that the BC layer comprises or consists of a material selected from the group consisting of NiCoCrAlY, Pt-modified diffusion aluminides and glass-ceramics. Alternatively, it may be provided that the BC layer comprises a material selected from the group consisting of NiCoCrAlY and Pt-modified diffusion aluminides.

In summary, the process according to the third aspect of the present invention for forming a CMAS resistant overlay coating, particularly an overlay coating according to the first aspect of the present invention, on a surface of a substrate comprising or consisting of a material susceptible to CMAS corrosion is versatile with respect to the surface properties, particularly the surface texture, straight-forward, relatively cost-efficient, energy-saving and easily scalable for industrial application.

The invention is now explained in more detail by the following figures and examples which are considered illustrative. The examples are restricting neither the invention's nor the claims' scope.

BRIEF DESCRIPTION OF THE DRAWINGS

FIG. 3 an enlarged section of FIG. 2, showing an uppermost region of the conventional thermal barrier coating and an undermost region of the overlay coating according to FIG. 2;

FIG. 4 an enlarged section of FIG. 2, showing an upper region of the overlay coating and a reaction zone located between an uppermost region of the overlay coating and an undermost region of the CMAS material;

FIG. 5 an enlarged section of FIG. 4, wherein a zone is marked which was examined by energy dispersive X-ray spectroscopy (EDS) line scan analysis;

Figure 1A:
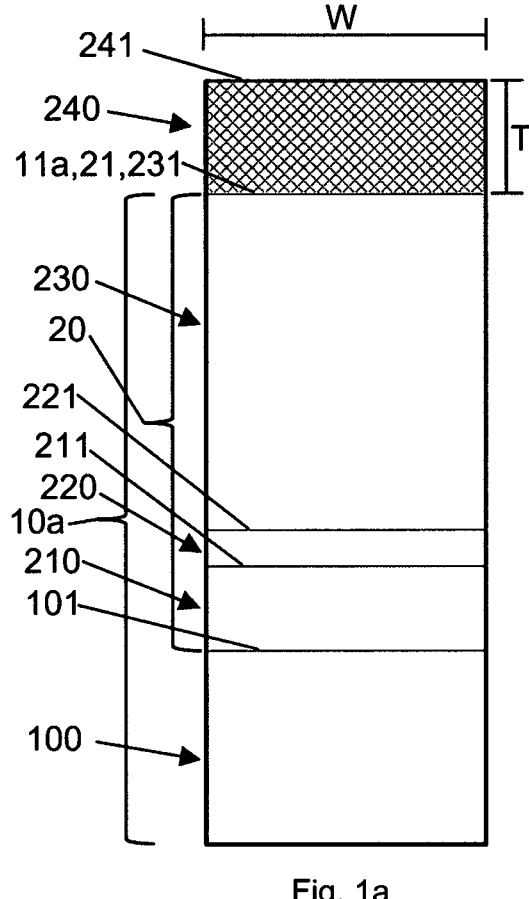
FIG. 1 Schematic drawings of a substrate comprising a) a TBC system and an overlay coating, b) the TBC system and the overlay coating being in contact with a CMAS layer, c) the TBC system and the overlay coating being in contact with a CMAS layer having been exposed to a temperature above its melting point, d) a TGO layer as an uppermost substrate layer having an overlay coating on an uppermost surface.

The left-hand part of FIG. 1 shows a schematic drawing of a multi-layer substrate 10a consisting of a base layer 100, particularly a metal or a metal alloy, and a TBC system 20. The TBC system consists of a BC layer 210, a TGO layer 220, a conventional thermal barrier coating 230, usually comprised of a YSZ material, wherein a CMAS resistant overlay coating 240 serves as a top layer, e.g. a CMAS resistant overlay coating according to the first aspect of the invention serves as a top layer. For instance, the CMAS resistant overlay coating 240 according to the first aspect of the present invention has a layer thickness the range from about 5 μm to about 49 μm when serving as a top layer as shown in FIG. 1a. However, dependent on its layer thickness T of the CMAS resistant overlay coating 240 according to the herein presented invention may serve both as a thermal barrier coating and as a top layer (FIG. 1d). Particularly, if the layer thickness T of the CMAS resistant overlay coating 240 is in the range from about 50 μm to about 300 μm, it is capable of serving both as a substitute for a conventional thermal barrier coating and as a protecting top layer. This is particularly beneficial as rare earth metals may be dispensed with.

A substrate 10a having an uppermost surface 11a and consisting of four substrate layers 100, 210, 220, 230, namely a base layer 100, which has an uppermost surface 101, and a TBC system 20, which has an uppermost surface 21, is the most prominent multi-layer substrate comprising or consisting of several materials susceptible to CMAS corrosion. The TBC system 20 shown in FIG. 1a consists of three substrate layers 210, 220, 230, namely of a BC layer 210 having an uppermost surface 211, a TGO layer 220 having an uppermost surface 221 and a thermal barrier coating 230 having an uppermost surface 231. Thereby, the uppermost surfaces 11a, 21 and 231 are identical. According to FIG. 1a the CMAS resistant overlay coating 240 serves as a top layer over the substrate 10a, i.e. on the uppermost surface 231 of the conventional thermal barrier coating 230. However, the CMAS resistant overlay coating 240 according to the first aspect of the invention may also be used for other types multi-layer substrates or for single-layer substrates comprising or consisting of one or more materials susceptible to CMAS corrosion and being exposed to high temperatures, and thus being in need of a protection against CMAS corrosion. Examples of materials susceptible to CMAS corrosion are metals, superalloys, particularly nickel-based alloys, cobalt-based alloys and titanium based alloys, ceramic materials, ceramic matrix composites (CMCs), e.g. a SiC-based CMC, and combinations thereof.

Figure 1B:
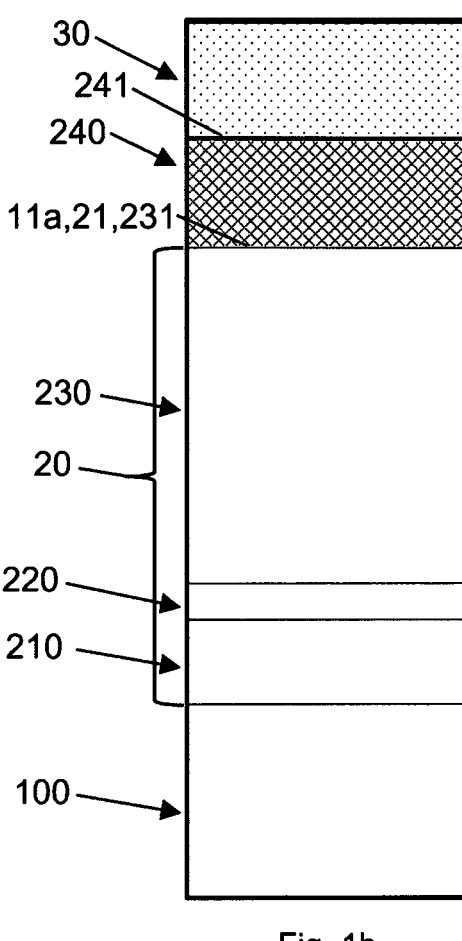
Figure 1C:
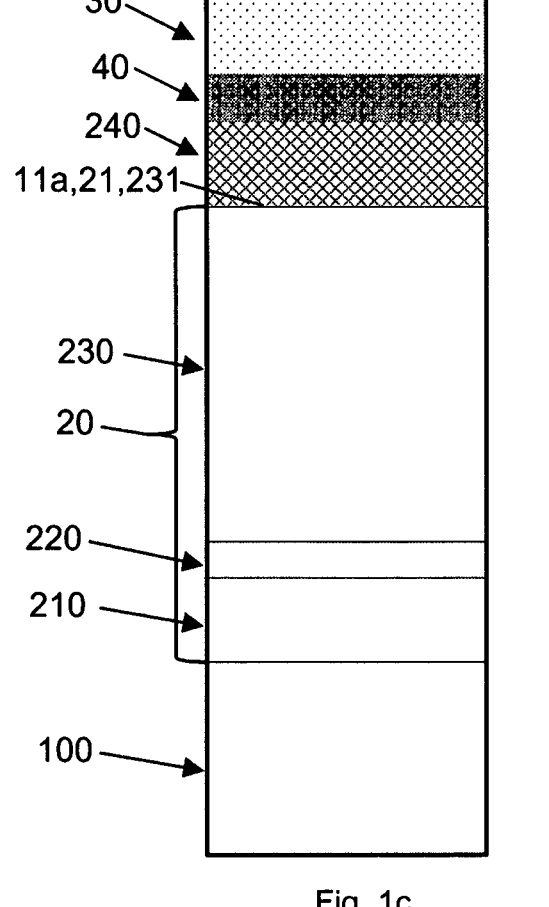
Figure 1D:
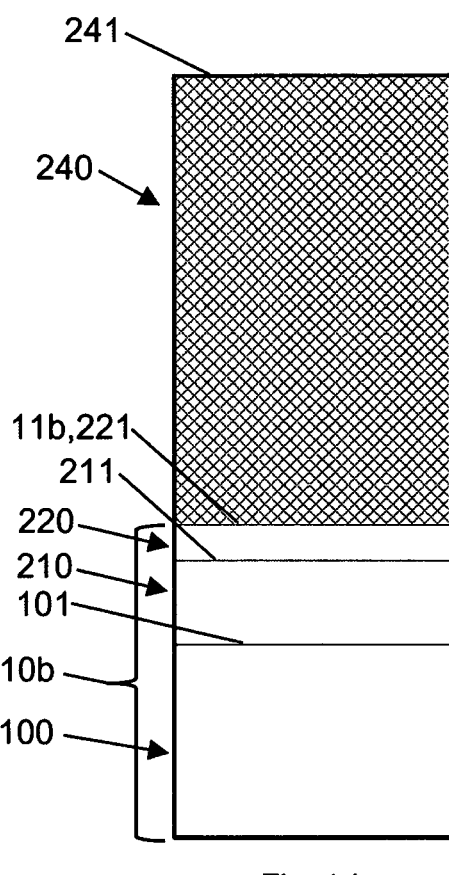

In FIG. 1d an example of another multi-layer substrate 10b having an uppermost surface 11b is presented. The substrate 10b consists only of three substrate layer 100, 210, 220, namely a base layer 100 having an uppermost surface 101, a BC layer 210 having an uppermost surface 211 and a TGO layer 220 having an uppermost surface 221. Thereby, the uppermost surfaces 11b and 221 are identical. No conventional thermal barrier coating 230 as shown in FIG. 1a is present. Instead, a CMAS resistant overlay coating 240 is provided which has—compared to that comprised in the TBC system 240 shown in FIG. 1a—a greater layer thickness T. Thus, in case of FIG. 1d the overlay coating 240 serves both as a thermal barrier coating and as a protective layer. In other words, the overlay coating 240 is used as a substitute for a conventional, typically YSZ-based, thermal barrier coating, and, in addition, as a protecting top layer. Advantageously, even though the layer thickness T of an overlay coating 240 as shown in FIG. 1d is preferably in the range from about 50 μm to about 300 μm the CMAS resistant overlay coating 240 is quite cost-efficient as only comparatively cheap aluminum and/or chromium are required instead of cost-intensive rare earth metals.

The CMAS resistant overlay coating 240 according to the first aspect of the present invention comprises a metal oxide matrix which is rare earth metal-free. At least one non-oxidized metallic constituent selected from the group consisting of aluminum, chromium and metallic constituents comprising or consisting of aluminum and chromium is embedded in the metal oxide matrix. The metal oxide of the CMAS resistant overlay coating 240 may comprise an oxidic species selected from the group consisting of Al—O species, Cr—O species and Al—Cr—O species, and mixtures thereof. In particular, immediately after its formation the CMAS resistant overlay coating 240 comprises a lower zone and an upper zone: The lower zone usually comprises an oxidic species selected from the group consisting of non-stoichiometric, oxygen deficient aluminum oxide, non-stoichiometric, oxygen deficient chromium oxide and non-stoichiometric, oxygen deficient aluminum chromium oxide, or a mixture thereof. And the upper zone comprises—normally in addition to non-stoichiometric, oxygen deficient aluminum oxide and/or non-stoichiometric, oxygen deficient chromium oxide and/or non-stoichiometric, oxygen deficient aluminum chromium oxide—at least one oxidic species selected from the group of aluminum oxide ($Al_2O_3$), chromium oxide ($Cr_2O_3$) and aluminum chromium oxide ($(Al, Cr)_2O_3$, or a mixture of at least one of the aforementioned non-stoichiometric oxides and at least one of the aforementioned stoichiometric oxides. Moreover, the CMAS resistant overlay coating 240 has a vertical columnar structure extending partially through a thickness T of the CMAS resistant overlay coating 240, advantageously through about 50% or more of the thickness T, or through the essentially entire or the entire thickness T of the CMAS resistant overlay coating 240. As an alternative or complementary columnar structure extends partially across a width W of the CMAS resistant overlay coating 240 or across the essentially entire or the entire width W of the CMAS resistant overlay coating 240. Furthermore, the layer thickness T of the CMAS resistant overlay coating 240 may be at least 5 μm and at most 300 μm.

Advantageously it is in the range from 10 μm to 250 μm, more advantageously in the range from 15 μm to 150 μm, particularly in the range from 20 μm to 100 μm. Independent of its layer thickness the overlay coating 240 is capable of providing elemental aluminum and/or elemental chromium and/or aluminum chromium at a temperature in the range from 1.000° C. to 1.600° C., advantageously in the range from 1.100° C. to 1.500° C., more advantageously in the range from 1.150° C. to 1.450° C. CMAS resistant overlay coatings 240 according to the first aspect of the present invention having a layer thickness T in the range from about 50 μm to about 300 μm are capable of serving both as a thermal barrier coating and as a top layer, advantageously up to 1.600° C. It is a major benefit over the prior art that the overlay coating 240 according to the first aspect of the present invention exhibits a very good mechanical stability and excellent adherence to the respective underlying layer, i.e. a conventional thermal barrier coating 230 (FIG. 1a) or a TGO layer 220 (FIG. 1d), for instance, under thermal cycling, even if temperatures of 1.500° C. or more, particularly up to 1.600° C., are applied.

Formation of the non-oxidized metallic constituents within the metal oxide matrix of the CMAS resistant overlay coating 240 can particularly be influenced and/or controlled by the target material composition, and—to a certain extent—by the oxygen partial pressure controlled and/or influenced by gas flow controller and the arc current. Hence, if desired formation of the intermetallic compounds comprising or consisting of aluminum and chromium can be fostered. After deposition and before exposition to high temperature the herein presented CMAS resistant overlay coating 240 comprises non-oxidized metallic constituents, namely aluminum and/or chromium and/or constituents comprising or consisting of aluminum and chromium, which can be proven by x-ray diffraction (XRD).

In FIG. 1b and FIG. 1c the CMAS resistant overlay coating 240 is in contact with a CMAS layer 30, containing particularly airborne dust and/or sand. The protective layer 240 of FIG. 1a, FIG. 1b and FIG. 1d, respectively, has not been exposed to high temperatures, i.e. temperatures of several hundred degrees Celsius or more, whereas the CMAS resistant overlay coating 240 in FIG. 1c has been exposed to a temperature above the melting point of the CMAS layer 30, being typically around or above 1.200° C.

Assuming that the overlay coating 240 disposed on the uppermost surface 21 of the TBC system 20 in FIG. 1*a*, FIG. 1*b* and FIG. 1*c* and disposed on the uppermost surface 221 of the TGO layer 220 in FIG. 1*d*, respectively, is a CMAS resistant overlay coating 240 according to the first aspect of the present invention the following happens upon heating at high temperatures, typically around or above 1.000° C., more typically around or above 1.200° C., particularly around or above 1.300° C.: Droplets of non-oxidized metallic constituents—embedded in the metal oxide matrix of the CMAS resistant overlay coating 240, particularly in a lower zone of the overlay coating 240, and selected from the group consisting of aluminum, chromium and metallic constituents comprising or consisting of aluminum and chromium—diffuse to an uppermost surface 241 of the overlay coating 240. The non-oxidized metallic constituents consisting of aluminum and chromium, e.g. $Al_8Cr_5$, decompose into their elements, whereby at least a part of them may be oxidized to one or more Al—O compounds and/or Cr—O compounds. The diffusion of chromium and/or aluminum leads to the following results:

1. Self-limiting oxidation of aluminum or non-stoichiometric Al—O species, respectively, resulting in a formation of corundum ($Al_2O_3$) layer in the lower zone of the overlay coating 240, particularly at and/or nearby an interface between an uppermost region of the conventional thermal barrier coating 230 (FIG. 1*a*) and an uppermost region of the TGO layer 220 (FIG. 1*d*), respectively, and an undermost region of the CMAS resistant overlay coating 240.

As a benefit of the formation of the corundum layer a volume increase and thus a densification and a closing of grain boundaries within the lower zone of the overlay coating 240 is observed, particularly at and/or nearby the interface between the uppermost region of the conventional thermal barrier coating 230 and the uppermost region of the TGO layer 220, respectively, and the undermost region of the CMAS resistant overlay coating 240.

2. Modification of the vertical columnar structure to a porous, vertical columnar structure in the overlay coating 240.

This leads to strain-tolerant properties and behavior, respectively, of the overlay coating 240, particularly at and/or nearby an uppermost surface 231 of the underlying conventional thermal barrier coating 230 and an uppermost surface 221 of the underlying TGO layer 220, respectively.

Advantageously, due to the porous and vertical columnar structure, under thermal cycling not only a very good strain tolerance and thus mechanical stability of the CMAS resistant overlay coating 240 is obtained, but also an excellent adherence of the overlay coating 240 to the immediately underlying conventional thermal barrier coating 230 and to the immediately underlying TGO layer 220, respectively, is achieved.

3. If the overlay coating 240 is in contact with one or more materials of a CMAS layer 30, which is heated to a temperature above its melting point, for example between around 1.200 and around 1.300° C., a chemical reaction takes place in a reaction zone 40, i.e. a region between an uppermost region of the overlay coating 240 and an undermost region of the CMAS layer 30. More precisely, a chemical reaction takes place between aluminum (Al) and/or chromium (Cr) and/or aluminum chromium (Al—Cr), which have diffused towards the uppermost surface 241 of the CMAS resistant overlay coating 240, and elements and/or constituents of the CMAS layer 30, particularly magnesium (Mg) and/or magnesium oxide (MgO). Thereby a barrier layer comprising Al—Mg—O species and/or Cr—Mg—O species and/or Al—Cr—Mg—O species is obtained. The barrier layer may also contain $MgAlO_4$ and/or $MgCrO_4$. Beneficially, the barrier layer formed within the reaction zone 40 or being essentially identical to or identical to the reaction zone 40 comprises at least one layer which consists of a material or of a material mixture exhibiting a higher melting temperature than the materials of the CMAS layer 30. Thus, the barrier layer serves as a diffusion barrier for the substrate 10*a* or 10*b* and the comprised layers (substrate 10*a*: 210, 220, 230; substrate 10*b*: 210, 220), respectively, against infiltration and/or degradation by elements and/or constituents contained in the CMAS layer 30.

If a portion of chromium does not undergo a chemical reaction with elements and/or constituents of the CMAS layer 30 being in contact with the CMAS resistant overlay coating 240 the chromium may be oxidized to one or more Cr—O compounds being volatile at the given high temperatures.

From the above it becomes clear that also other overlay coatings being able to set elemental Al and/or Cr free at high temperatures can be applied for protecting substrates comprising or consisting of materials susceptible to CMAS corrosion.

The above-described behavior and advantages of a CMAS resistant overlay coating 240 according to the first aspect of the present invention are presented below by means of an example. It should be noted that the layers, which are mentioned in the context of the example, do not necessarily have a uniform thickness. However, in case a layer thickness is specified, this layer thickness is present at least in sections of the layer, namely as a maximum thickness.

FIG. 2 to FIG. 8 refer to an example of a CMAS resistant overlay coating 240—according to the first aspect of the invention—, which has been formed and deposited, respectively, by a cathodic arc evaporation (CAE) process—according to the third aspect of the present invention—as a top layer on a multi-layer substrate as shown in FIG. 1*a*. The latter consists of a base layer 100 and a conventional TBC system 20, wherein the TBC system 20 consists of a BC layer 210, a TGO layer 220 and a conventional thermal barrier coating 230. In a next step the CMAS resistant overlay coating 240 was exposed to a CMAS layer 30 at a temperature of about 1.300° C. for several hours. After cooling down the molten CMAS material 30 to room temperature an upper region of the TBC system 20, i.e. an uppermost region of the conventional thermal barrier coating 230, as well as a reaction zone 40 located between an uppermost region of the overlay coating 240 and an undermost region of the CMAS layer 30 were investigated. Standard methods like cross-sectional scanning electron microscopy (X-SEM) and energy dispersive X-ray spectroscopy (EDS) line scan analysis were applied. The results are given in FIG. 2 to FIG. 8. It should be noted that it did not make a difference whether the conventional thermal barrier coating 230 consisted of a 7 wt. % yttria-stabilized zirconia (7YSZ) or of an 8 wt. % yttria-stabilized zirconia (8YSZ).

Figure 2:
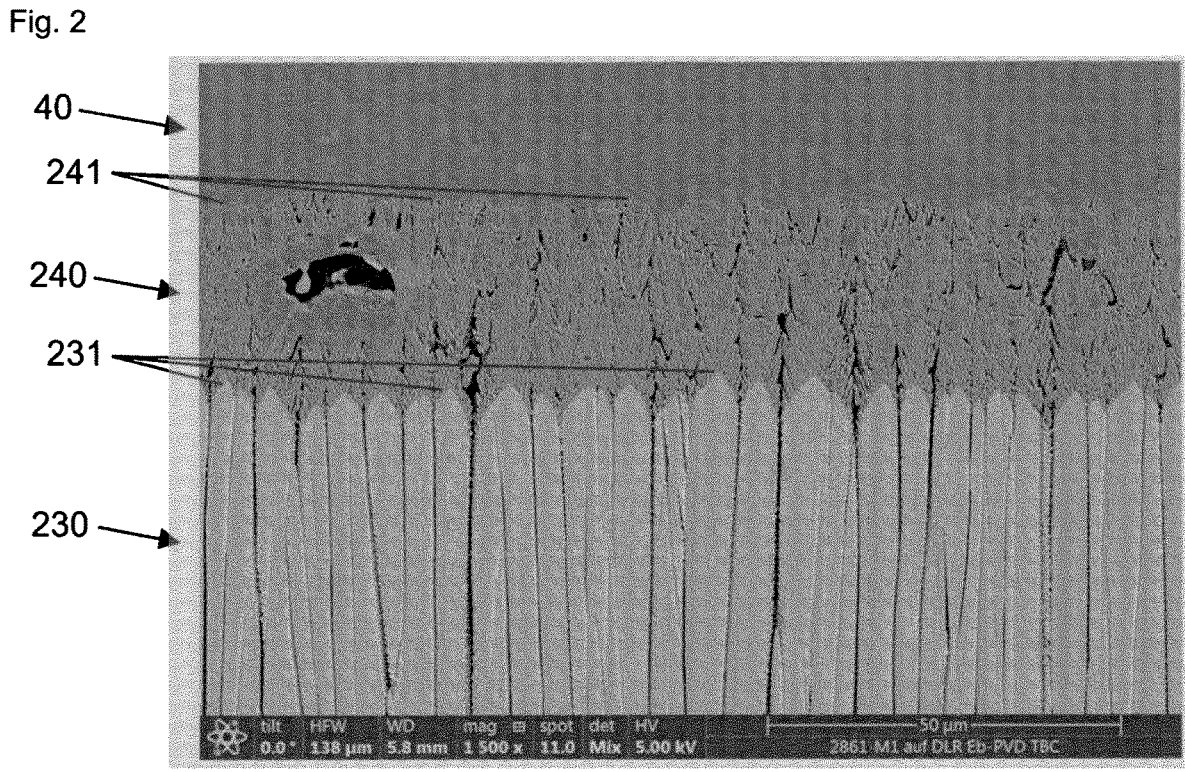
FIG. 2 a cross-sectional scanning electron microscopy (X-SEM) image of an upper region of a conventional thermal barrier coating with an overlay coating according to the first aspect of the invention, obtained after exposure of the overlay coating to a CMAS material at a temperature of about 1.300° C. for several hours and cooling down to room temperature.

The lower half of FIG. 2 shows an X-SEM image of an upper region of the conventional thermal barrier coating 230. It can be recognized that the uppermost surface 231 of the conventional thermal barrier coating 230 is coated with an overlay coating 240 according to the first aspect of the invention having a layer thickness T of about 20 μm. As can be seen from the X-SEM image in FIG. 2 the upper region of the conventional thermal barrier coating 230 still exhibits a columnar and feather-like structure characteristic of a conventional thermal barrier coating 230 formed by means of EB-PVD. The CMAS resistant overlay coating 240 has a porous, vertical columnar structure structure and morphology, respectively. In the left-hand area of the SEM image a relatively large cavity within the CMAS resistant overlay coating 240 is visible which stems from a larger metal droplet which disappeared by diffusion during thermal cycling. However, the decisive factor in the development of the overlay coating's 240 porous structure—in addition to the overlay coating's 240 columnar structure already present after its deposition on the uppermost surface 231 of the conventional thermal barrier coating 230—is an outward diffusion of much smaller metal droplets upon heating at a temperature of about 1.300° C. The latter results in a relatively fine porous structure of the CMAS resistant overlay coating 240. In the uppermost region of the X-SEM image the reaction zone 40 can be seen after cooling down from about 1.300° C. to room temperature.

Figure 3:
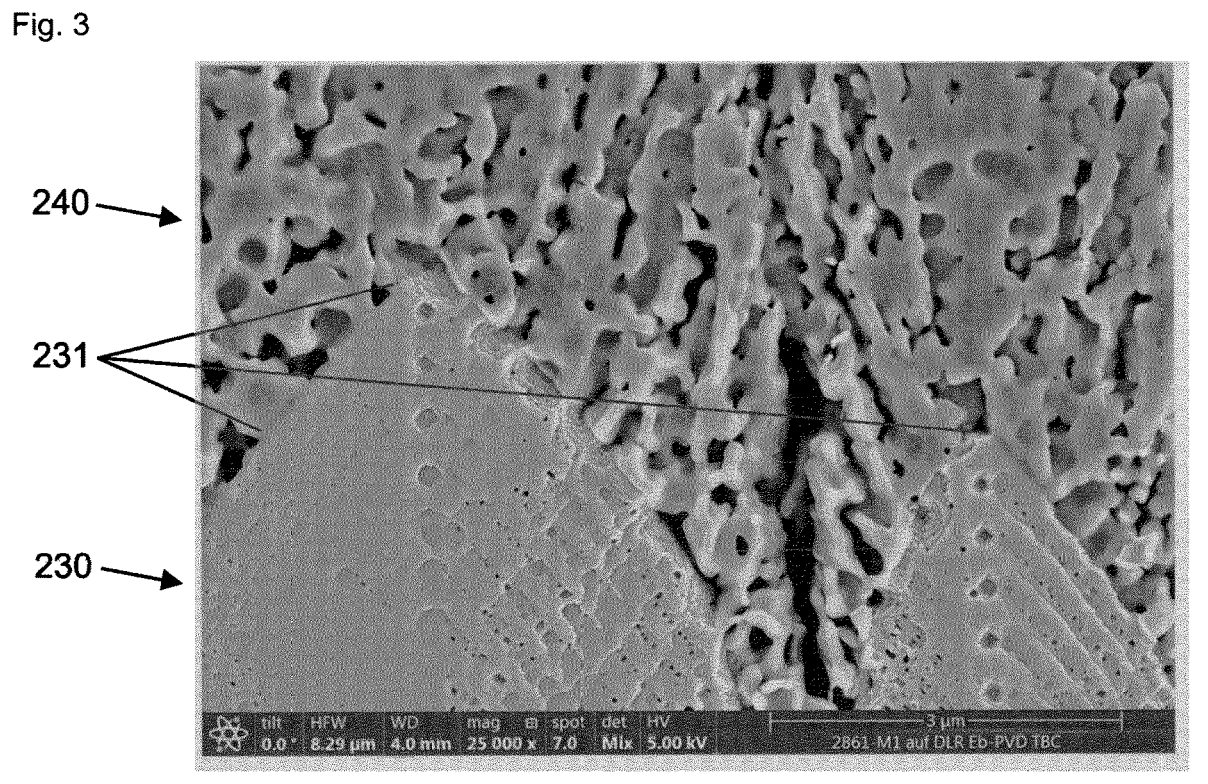

FIG. 3 shows an enlarged section of FIG. 2, more precisely an uppermost region of the conventional thermal barrier coating 230 and an undermost region of the overlay coating 240 according to the first aspect of the present invention. The very good adhesion of the CMAS resistant overlay coating 240 to the conventional thermal barrier coating 230 is illustrated. Moreover, the development of the overlay coating's 240 porous structure—in addition to the overlay coating's 240 columnar structure already present after its deposition on the uppermost surface 231 of the conventional thermal barrier coating 230—due to the outward diffusion of smaller metal droplets upon heating at a temperature of about 1.300° C. can be seen. The latter is essential to achieve the strain tolerant properties and thus mechanical stability of the overlay coating 240.

Figure 4:
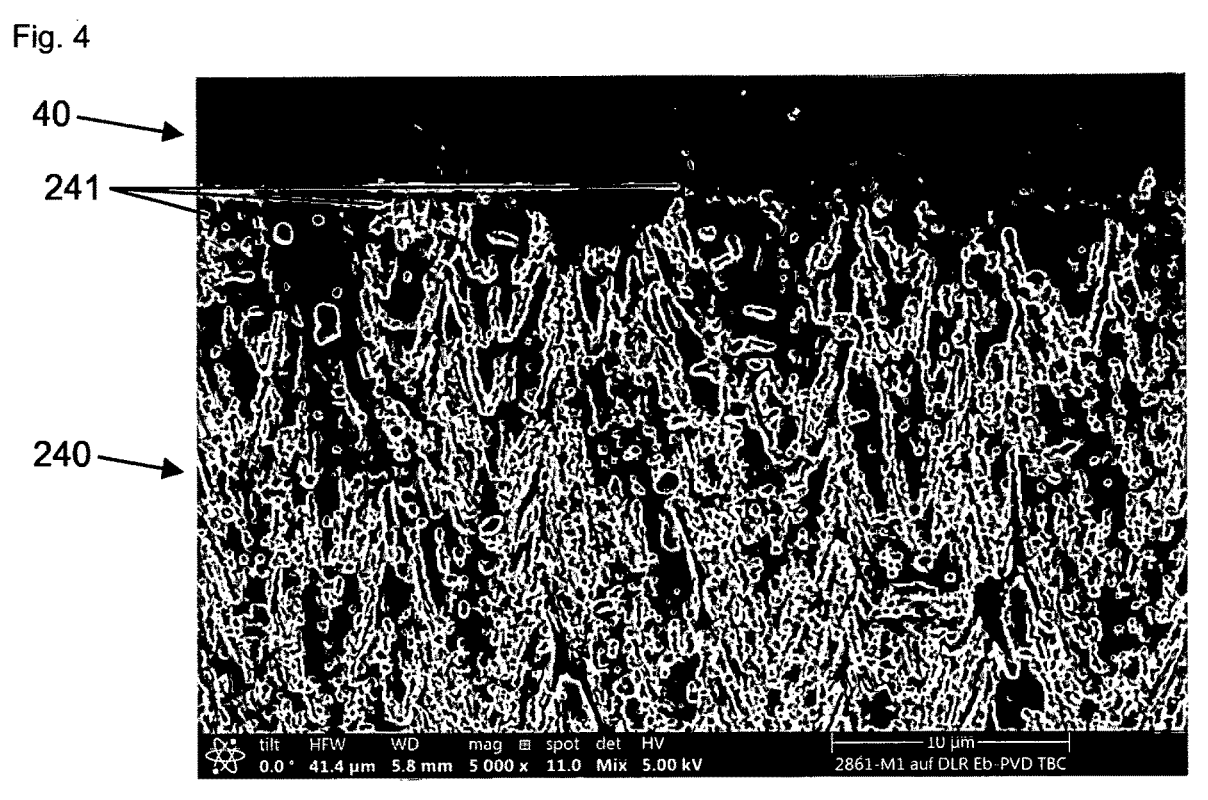

FIG. 4 shows an enlarged section of FIG. 2, more precisely an upper region of the overlay coating 240 as well as the reaction zone 40 located between the uppermost region of the overlay coating 240 and the undermost region of the CMAS layer 30 (not shown in FIG. 4). It should be noted that the upper region of the CMAS resistant overlay coating 240 is not necessarily identical to the above-mentioned upper zone of the overlay coating 240. However, there might be an overlap between the upper region and the upper zone of the overlay coating 240. The reaction zone 40 is formed during the chemical reaction between aluminum (Al) and/or chromium (Cr) and/or aluminum chromium (Al—Cr) having been diffused towards the uppermost surface 241 of the CMAS resistant overlay coating 240 and elements and/or constituents of the CMAS layer 30, particularly magnesium (Mg) and/or magnesium oxide (MgO). Thereby the barrier layer comprising Al—Mg—O species and/or Cr—Mg—O species and/or Al—Cr—Mg—O species, and possibly $MgAlO_4$ and/or $MgCrO_4$, is obtained. The reaction zone 40 was examined by energy dispersive X-ray spectroscopy (EDS) line scan analysis (see FIG. 7 and FIG. 8).

Figure 5:
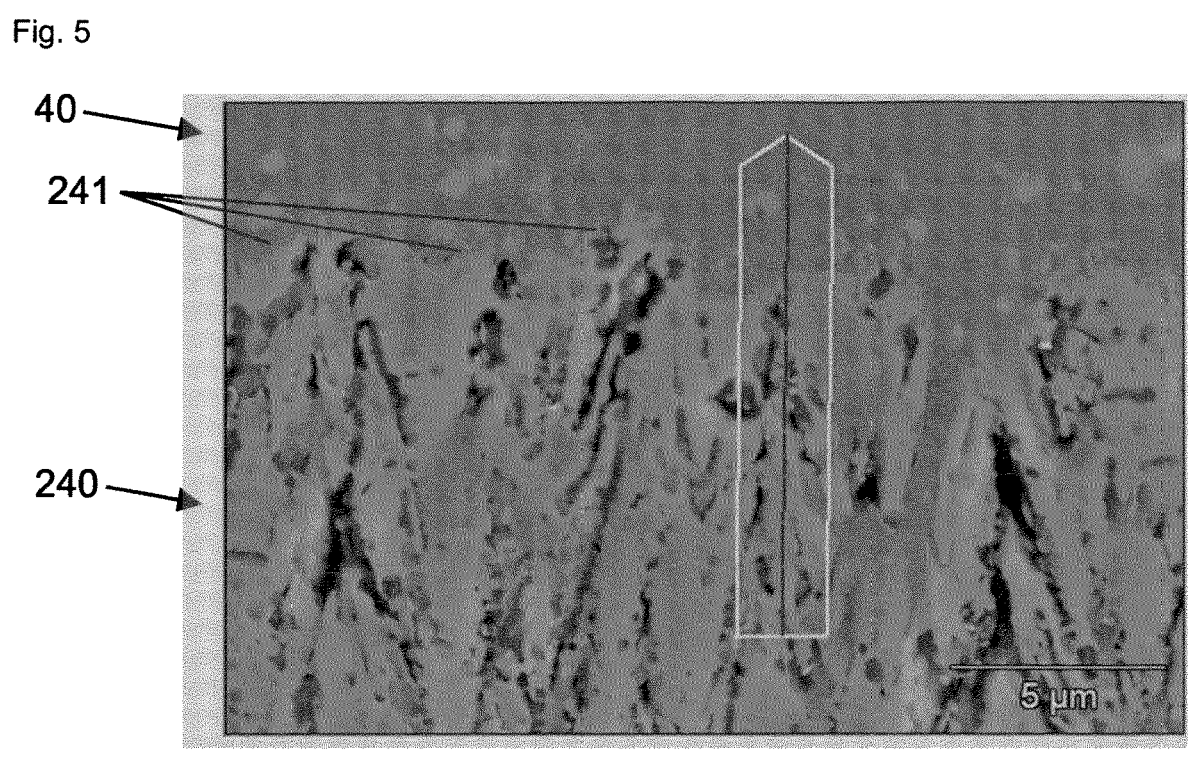
Figure 6:
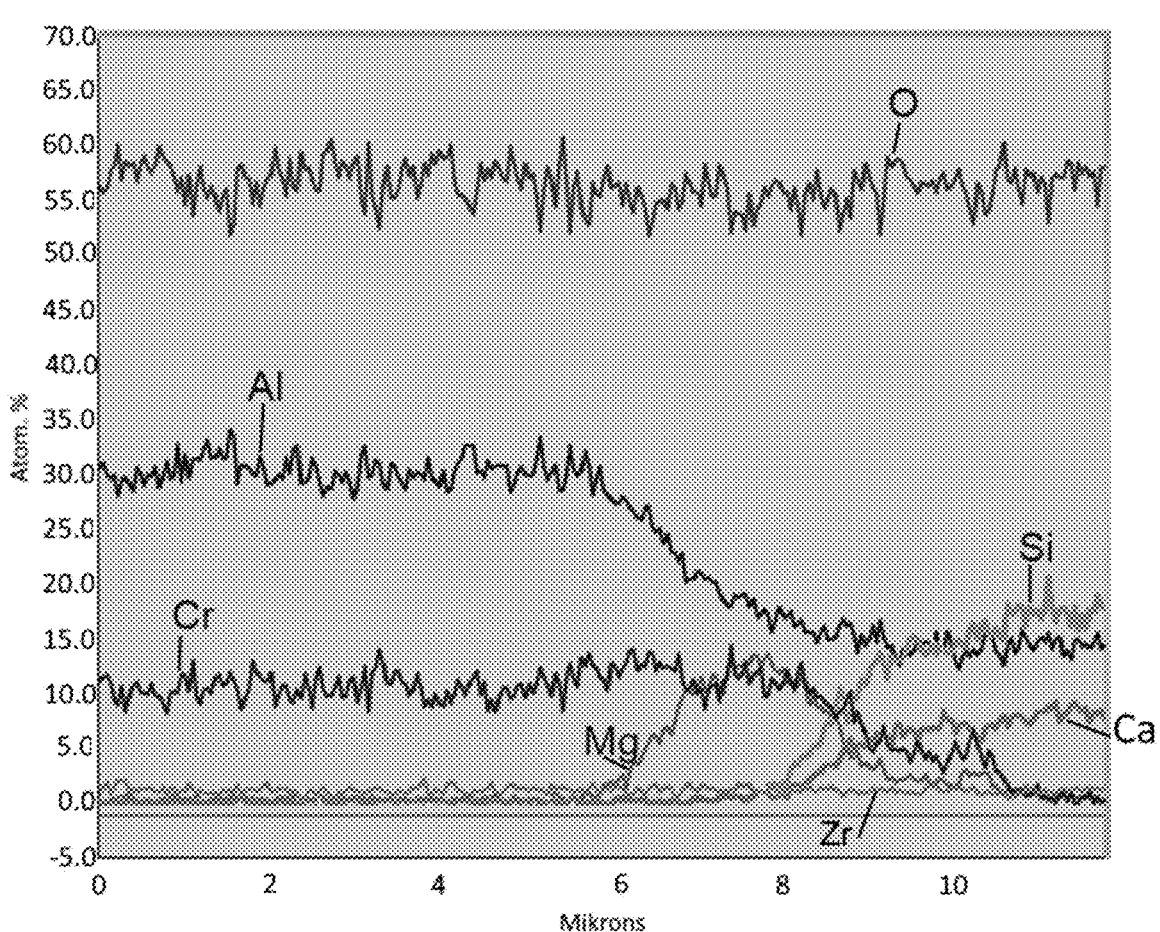
FIG. 6 an overlay of EDS spectra as a result of the line scan analysis conducted within the zone according to FIG. 5.

In FIG. 5 an enlarged section of FIG. 4 is shown, wherein a zone is marked which extends along an almost vertical axis from the upper region of the CMAS resistant overlay coating 240 to the undermost region of the reaction zone 40. The chemical composition of the marked zone was determined by means of EDS line scan analysis. In FIG. 6 an overlay of the EDS spectra obtained for the dominant elements, i.e. Al, Cr, O, Mg, Si and Ca, is given illustrating the chemical composition of the scanned zone. The x-axis represents the position (in μm) of the respective element, i.e. Al, Cr, O, Mg, Si and Ca, within the marked zone: 0 μm is related to the bottom of the scanned zone and the starting point of the line scan, respectively, whereas 12 μm (the number 12 is not shown in FIG. 6) is related to the top of the scanned zone and the ending point of the line scan, respectively. The atomic percentage of the elements at the respective position within the scanned zone is plotted on the y-axis. Within a first section (from 0 μm to about 6 μm) of the scanned zone the elements comprised in the CMAS resistant overlay coating 240 were detected. In a second section (from about 6 μm to about 9 μm), immediately adjacent to the first section, the elements Al, Cr, O and Mg being typical of the reaction zone 40, which has in this case a thickness of about 3 μm, were identified. In a third section (from about 9 μm to about 12 μm), immediately adjacent to the second section, elements comprised in the CMAS layer 30, i.e. particularly Ca, Si and O, as well as Cr were detected. With respect to the composition of the reaction zone 40 it is worth mentioning that it cannot be distinguished between Al stemming from the CMAS layer 30 and Al diffused from the CMAS resistant overlay coating 240. However, the reaction zone 40 could clearly be determined by the detected Cr.

Figure 7:
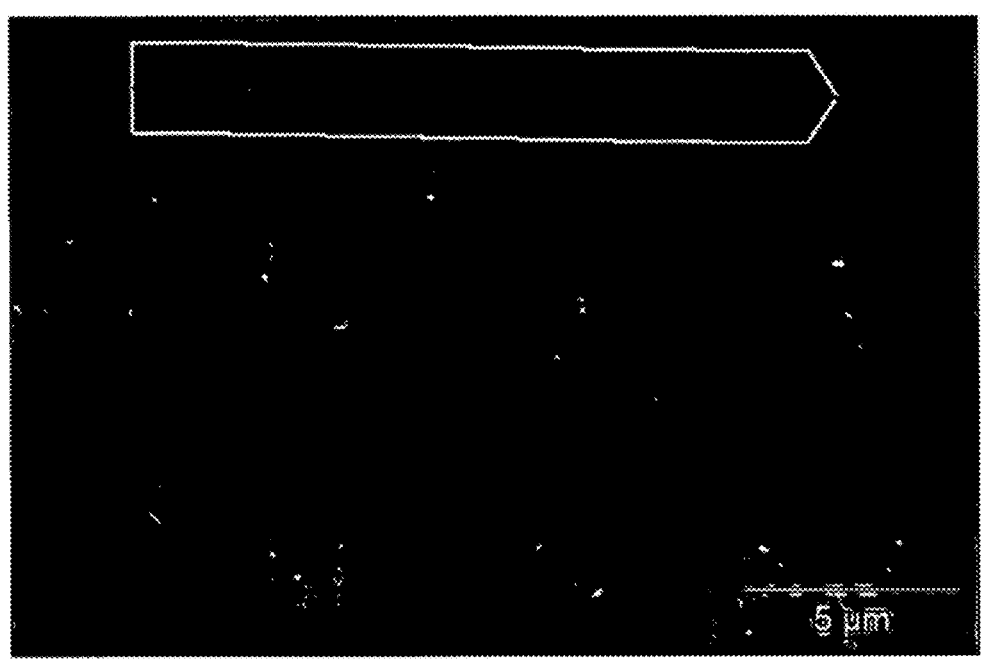
FIG. 7 the image of FIG. 5, wherein a zone is marked which was examined by EDS line scan analysis is.
Figure 8:
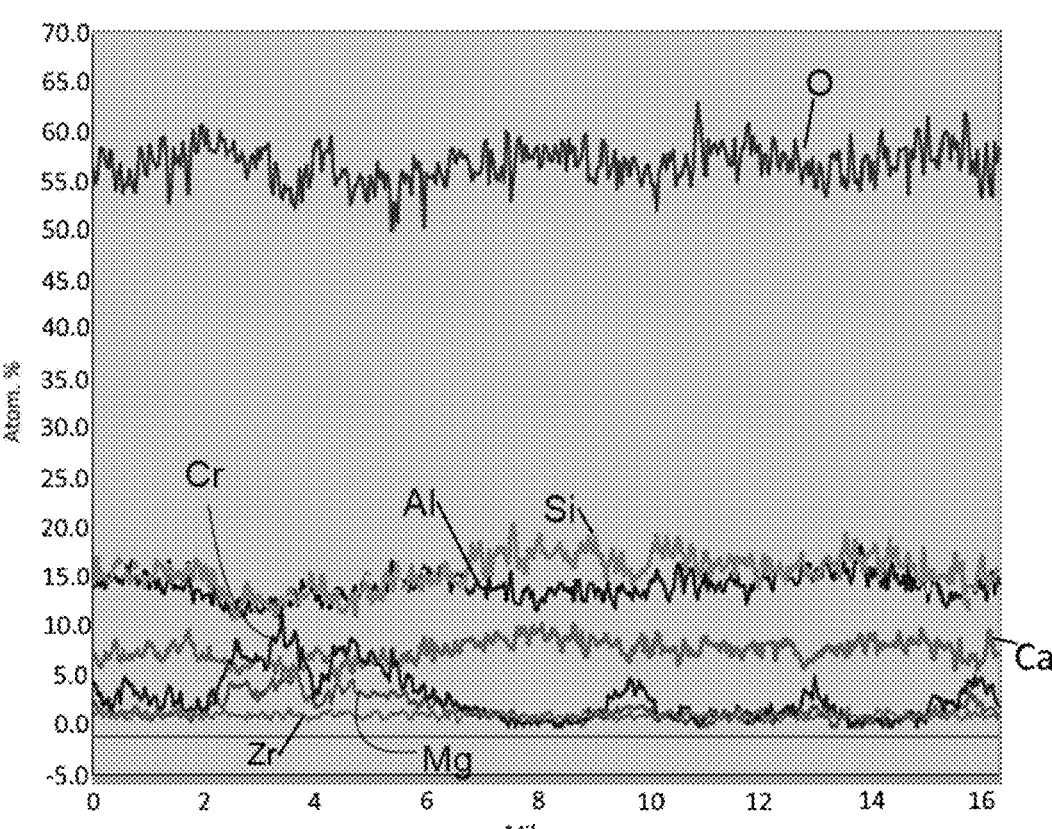
FIG. 8 an overlay of EDS spectra as a result of the line scan analysis conducted within the zone according to FIG. 7.

FIG. 7 shows the image of FIG. 5, wherein a zone is marked which extends along an axis being essentially parallel to the uppermost surface 241 of the CMAS resistant overlay coating 240. The chemical composition of the marked zone being within the reaction zone 40 was determined by means of EDS line scan analysis. In FIG. 8 an overlay of the EDS spectra obtained for the dominant elements, i.e. Al, Cr, O, Mg, Si and Ca, is given illustrating the chemical composition of the scanned zone. The x-axis represents the position (in μm) of the respective element, i.e. Al, Cr, O, Mg, Si and Ca, within the marked zone: 0 μm is related to the left limit of the scanned zone and the starting point of the line scan, respectively, whereas 16 μm is related to the right limit of the scanned zone and the ending point of the line scan, respectively. The atomic percentage of the elements at the respective position within the scanned zone is plotted on the y-axis. It can be seen from FIG. 8 that there exists a correlation between the Cr intensity and the Mg intensity, indicating that a chemical reaction takes place between at least these two elements.

In summary, the example describes a well adhering, strain tolerant CMAS resistant overlay coating 240 according to the first aspect of the invention, its elevated temperature properties and behavior, respectively, as well as its advantages when being in contact with elements and/or constituents of a CMAS layer 30 at high temperatures: At a temperature in the range from 1.000° C. to 1.600° C., for instance at a temperature of about 1.300° C., the overlay coating 240 is capable of providing and releasing, respectively, elemental aluminum and/or elemental chromium and/or aluminum chromium. The elemental aluminum and the elemental chromium are in the form of droplets, whereas the non-oxidized metallic constituents consisting of aluminum and chromium may be independently of each other in the form of alloys, intermetallic compounds or solid solutions. In the reaction zone 40, i.e. the region between the uppermost region of the overlay coating 240 and the undermost region of the CMAS layer 30, the provided aluminum and/or chromium undergo a chemical reaction with elements and/or constituents of the CMAS layer 30, particularly magnesium (Mg) and/or magnesium oxide (MgO). Thereby a barrier layer comprising Al—Mg—O species and/or Cr—Mg—O species and/or Al—Cr—Mg—O species is obtained. The barrier layer may also contain $MgAlO_4$ and/or $MgCrO_4$. Beneficially, the barrier layer formed within the reaction zone 40 or being essentially identical to or identical to the reaction zone 40 comprises at least one layer which consists of a material or of a material mixture exhibiting a higher melting temperature than materials contained in the CMAS layer 30. Thus, the barrier layer prevents the further infiltration of elements and/or constituents of the CMAS layer 30 into the underlying substrate 10a comprising a TBC system 20.

EXAMPLES

Methods and Materials

Cathodic Arc Evaporation (CAE)
    CAE was performed by using an INNOVA batch-type coating system of Oerlikon Balzers Coating AG. The skilled person knows how to. He can apply this knowledge without departing from the scope of the claims.
Cross-Sectional Scanning Electron Microscopy (X-SEM)
    The cross-section analyzed in a Zeiss LEO 1530 scanning electron microscope (SEM) were obtained by ion milling.
Energy Dispersive X-Ray Spectroscopy (EDS)
    The elemental compositions of the cross-sections analyzed by SEM were determined by energy-dispersive X-ray spectroscopy (EDS) in the Zeiss LEO 1530 SEM.

Example 1: Formation of an about 20 µm Thick CMAS Resistant Overlay Coating According to the First Aspect of the Present Invention on a Conventional Thermal Barrier Coating by Means of a Process According to the Third Aspect of the Invention Described Herein The aluminum chromium target (70 at. % Al, 30 at. % Cr) was operated in the vacuum chamber of the cathodic arc evaporation apparatus together with oxygen as reactive gas, wherein a partial pressure of oxygen gas in the chamber was 1.0 Pa. Evaporation of the target material was initiated by ignition of the cathodic arc. The evaporated target material reacted with the oxygen gas and formed the CMAS resistant overlay coating on the uppermost surface of the YSZ-based thermal barrier coating being the uppermost layer of the TBC system.

Example 2: Formation of a Barrier Layer with the Participation of the CMAS Resistant Overlay Coating According to Example 1

CMAS ash powder was dispersed on the CMAS resistant coating layer formed according to Example 1. Subsequently, formation of the barrier layer was conducted by heating the substrate obtained from Example 1 in air at a temperature of 1.300° C. for a period of 1 h.
    The invention is not limited to any one of the embodiments described above, but modifiable in various ways.
    As can be seen, the present invention relates to a well adhering, strain tolerant CMAS resistant overlay coating comprising at least one CMAS resistant layer, wherein the overlay coating is i. disposed on a surface of a substrate, i.e. on a surface of at least one of the substrate layers, comprising or consisting of a material susceptible to CMAS corrosion, ii. comprises a metal oxide matrix and iii. has at least partially a vertical columnar structure. Moreover, at least one non-oxidized metallic constituent selected from the group consisting of aluminum, chromium and metallic constituents comprising or consisting of aluminum and chromium is embedded in the metal oxide matrix.

Furthermore, the invention concerns a substrate having a CMAS resistant overlay coating at issue on a surface of a substrate comprising or consisting of a material susceptible to CMAS corrosion. The invention also relates to a CAE process for forming such a CMAS resistant overlay coating on a surface of a substrate comprising or consisting of a material susceptible to CMAS corrosion.
    Advantageously, the CMAS resistant overlay coating according to the first aspect of the invention is capable of releasing elemental aluminum and/or elemental chromium and/or aluminum chromium at high temperature at which an overlying CMAS material layer melts, for example at a temperature in the range from 1.000° C. to 1.600° C., advantageously in the range from 1.100° C. to 1.500° C., more advantageously in the range from 1.150° C. to 1.450° C.
In brief, a barrier layer preventing the further infiltration of CMAS contaminants into an underlying substrate and the layers of the underlying substrate, respectively, particularly into at least one layer of a TBC system comprised in the substrate, is formed by:
    1. Deposition of a CMAS resistant overlay coating on a surface of a substrate comprising or consisting of a material susceptible to CMAS corrosion, the overlay coating comprising a metal oxide matrix and having at least partially a vertical columnar structure, wherein aluminum and/or chromium and/or metallic constituents comprising or consisting of aluminum and chromium are embedded in the metal oxide matrix;
    2. Outward diffusion of the non-oxidized metallic constituents to an uppermost surface of the overlay coating being in contact with the overlying CMAS material layer;
    3. Chemical reaction of the released aluminum and/or chromium with elements and/or constituents of the CMAS material, particularly magnesium (Mg) and/or magnesium oxide (MgO).
    All features and advantages arising from the claims, the description and the figures, including design details, spatial arrangements and procedure steps, can be essential to the invention, either individually or in various combinations.

REFERENCE SIGNS LIST

10a, 10b substrate
11a, 11b uppermost surface
100 base layer
101 uppermost surface
20 TBC system
21 uppermost surface
210 BC layer
211 uppermost surface
220 TGO layer
221 uppermost surface
230 thermal barrier coating
231 uppermost surface
240 overlay coating
241 uppermost surface
30 CMAS layer; CMAS material
40 reaction zone
T thickness of the overlay coating
W width of the overlay coating

What is claimed is:
    1. An overlay coating (240),
    wherein the overlay coating (240)

i. is disposed on a surface (101, 211, 221, 231) of a substrate (10*a*, 10*b*) comprising a material susceptible to CMAS corrosion, ii. comprises a metal oxide matrix, wherein at least one non-oxidized metallic constituent comprising aluminum and chromium is embedded in the metal oxide matrix, and iii. has at least partially a vertical columnar structure, wherein the metallic constituents comprising aluminum and chromium comprise $Al_1Cr_2$ or $Al_8Cr_5$, or a combination or a mixture thereof.

2. The overlay coating (240) according to claim 1, wherein the overlay coating (240) is rare earth metal-free.

3. The overlay coating (240) according to claim 1, wherein the metal oxide matrix comprises at least one oxidic species containing aluminum and/or chromium.

4. The overlay coating (240) according claim 1, wherein the metal oxide matrix comprises an oxidic species selected from the group consisting of Al—O species, Cr—O species and Al—Cr—O species, and mixtures thereof.

5. The overlay coating (240) according to claim 1, wherein the metal oxide matrix comprises an oxidic species selected from the group consisting of non-stoichiometric, oxygen deficient aluminum oxide, non-stoichiometric, oxygen deficient chromium oxide and non-stoichiometric, oxygen deficient aluminum chromium oxide, aluminum oxide (Al2O3), chromium oxide (Cr2O3) and aluminum chromium oxide (Al,Cr)2O3, and mixtures thereof.

6. The overlay coating (240) according to claim 1, wherein the overlay coating (240) comprises a lower zone and an upper zone, wherein i. the lower zone comprises an oxidic species selected from the group consisting of non-stoichiometric, oxygen deficient aluminum oxide, non-stoichiometric, oxygen deficient chromium oxide and non-stoichiometric, oxygen deficient aluminum chromium oxide, and mixtures thereof, and ii. the upper zone comprises a stoichiometric oxidic species selected from the group consisting of aluminum oxide ($Al_2O_3$), chromium oxide ($Cr_2O_3$) and aluminum chromium oxide ($(Al,Cr)_2O_3$, and mixtures thereof.

7. The overlay coating (240) according to claim 1, wherein non-oxidized aluminum chromium is in the form of metal droplets.

8. The overlay coating (240) according to claim 1, wherein the overlay coating (240) is capable of providing elemental aluminum and/or elemental chromium and/or aluminum chromium at a temperature in the range from 1000° C. to 1600° C.

9. The overlay coating (240) according to claim 1, wherein the vertical columnar structure of the overlay coating (240) extends partially through a thickness (T) of the overlay coating (240) or through the essentially entire or the entire thickness (T) of the overlay coating (240)

and/or partially across a width (W) of the overlay coating (240) or across the essentially entire or the entire width (W) of the overlay coating (240).

10. The overlay coating (240) according to claim 1, wherein the overlay coating (240) has a layer thickness (T) in the range from 5 μm to 300 μm.

11. The overlay coating (240) according to claim 1, wherein the overlay coating (240) serves as a top layer over a thermal barrier coating.

12. The overlay coating (240) according to claim 1, wherein the overlay coating (240)

i. has a layer thickness (T) in the range from 50 μm to 300 μm, and ii. serves both as a thermal barrier coating and as a top layer.

13. A substrate (10*a*, 10*b*) comprising a material susceptible to CMAS corrosion, wherein the substrate (10*a*, 10*b*)

i. comprises at least one substrate layer (100, 210, 220, 230) comprising a material susceptible to CMAS corrosion, and ii. has an overlay coating (240) according to claim 1 on a surface (101, 211, 221, 231) of at least one of the substrate layers (100, 210, 220, 230).

14. The substrate (10*a*, 10*b*) according to claim 13, wherein the material susceptible to CMAS corrosion is selected from the group consisting of metals, superalloys, ceramic materials and ceramic matrix composites (CMCs), and combinations thereof.

15. The substrate (10*a*, 10*b*) according to claim 13, wherein at least one of the substrate layers (100, 210, 220,230) comprises a CMC comprising a SiC-based CMC.

16. The substrate (10*a*, 10*b*) according to claim 13, wherein i. the substrate (10*a*) comprises a base layer (100)

and a thermal barrier coating (TBC) system (20) comprising a YSZ-based thermal barrier coating (230) disposed on a thermally grown oxide (TGO) layer (220), or ii. the substrate (10*b*) comprises a base layer (100)

and a bond coat (BC) layer (210) and a TGO layer (220), wherein the BC layer (210) is disposed between the base layer (100) and the TGO layer (220).

17. The substrate (10*a*, 10*b*) according to claim 16, wherein the base layer (100) is a part of a gas turbine.

18. The substrate (10*a*) according to claim 16, wherein the TBC system (20) comprises a bond coat (BC) layer (210) disposed between the base layer (100) and the TGO layer (220).

19. The substrate (10*a*, 10*b*) according to claim 16, wherein the BC layer (210) comprises a material selected from the group consisting of NiCoCrAlY, Pt-modified diffusion aluminides and glass-ceramics.

20. A cathodic arc evaporation (CAE) process for forming an overlay coating (240) according to claim 1 on a surface (101, 211, 221, 231) of a substrate (10*a*, 10*b*), comprising a material susceptible to CMAS corrosion, wherein the process comprises the steps of:

A. providing a target for use as a cathodic material, wherein a target material comprises aluminum and/or chromium, B. providing a process gas comprising oxygen, C. evaporating aluminum and/or chromium from the target material provided in step A., D. reacting the evaporated aluminum and/or chromium evaporated in step C. with the process gas provided in step B., and E. depositing the reaction product of step D. as a CMAS resistant overlay coating (240) on a surface (101, 211,

221, 231) of the substrate (10*a*, 10*b*) comprising a material susceptible to CMAS corrosion.

21. The process according to claim 20, wherein the target material comprises aluminum and/or chromium, wherein chromium is comprised in an amount of at least 15 atomic percentage.

22. The process according to claim 20, wherein the target material i. comprises aluminum and chromium, or ii. consists of aluminum and chromium.

23. The process according to claim 20, wherein a partial pressure of oxygen is in the range from 0.001 Pa to 10 Pa.

\* \* \* \* \*